(12) United States Patent
Zhang et al.

(10) Patent No.: US 11,646,821 B2
(45) Date of Patent: *May 9, 2023

(54) METHOD AND DEVICE FOR DETERMINING TIME FREQUENCY RESOURCES

(71) Applicant: ZTE CORPORATION, Guangdong (CN)

(72) Inventors: Chenchen Zhang, Shenzhen (CN); Peng Hao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,071

(22) Filed: Dec. 21, 2021

(65) Prior Publication Data

US 2022/0368459 A1 Nov. 17, 2022

Related U.S. Application Data

(63) Continuation of application No. 16/830,113, filed on Mar. 25, 2020, now Pat. No. 11,212,038, which is a
(Continued)

(30) Foreign Application Priority Data

Sep. 30, 2017 (CN) .......................... 201710940914.X

(51) Int. Cl.
*H04L 1/00* (2006.01)
*H04L 5/00* (2006.01)
(Continued)

(52) U.S. Cl.
CPC .......... *H04L 1/0068* (2013.01); *H04L 5/0092* (2013.01); *H04L 5/0098* (2013.01);
(Continued)

(58) Field of Classification Search
CPC ... H04L 1/0068; H04L 5/0092; H04L 5/0098; H04W 72/042; H04W 72/0446; H04W 72/0453; H04W 72/0493
See application file for complete search history.

(56) References Cited

U.S. PATENT DOCUMENTS

2013/0194931 A1* 8/2013 Lee ...................... H04W 72/04
370/329
2013/0265955 A1 10/2013 Kim et al.
(Continued)

FOREIGN PATENT DOCUMENTS

CN 105659518 A 6/2016
CN 106921478 A 7/2017
(Continued)

OTHER PUBLICATIONS

Catt, "PDSCH and PUSCH Resource Allocation", 3GPP TSG RAN WGJ Meeting AH_#NR3, RI-1715824, Sep. 21, 2017, section 3.2.1 (11 pages).
(Continued)

Primary Examiner — Jael M Ulysse
(74) Attorney, Agent, or Firm — Foley & Lardner LLP

(57) ABSTRACT

A method and a device for determining time-frequency resources comprise: a first communication node determining at least one piece of the following information about a first resource set: time-frequency resources of a second resource set contained in the first resource set, configuration information of the second resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to implement rate matching; and transmitting the information to a second communication node. Therefore, the problem in the related art of
(Continued)

A first communication node determines at least one piece of the following information about a first resource set for a second communication node: time-frequency resources of a second resource set contained in the first resource set, configuration information of the second resource set contained in the first resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to perform rate matching  — S102

Transmit the information to the second communication node — S104 how to indicate the time-frequency resources used in the PDSCH transmission or the PUSCH transmission is solved, and the time-frequency resources used in the PDSCH transmission or the PUSCH transmission are indicated to a user.

12 Claims, 5 Drawing Sheets

Related U.S. Application Data continuation of application No. PCT/CN2018/104754, filed on Sep. 10, 2018.

(51) Int. Cl.
*H04W 72/0446* (2023.01)
*H04W 72/0453* (2023.01)
*H04W 72/23* (2023.01)
*H04W 72/53* (2023.01)

(52) U.S. Cl.
CPC ... *H04W 72/0446* (2013.01); *H04W 72/0453* (2013.01); *H04W 72/23* (2023.01); *H04W 72/53* (2023.01)

(56) References Cited

U.S. PATENT DOCUMENTS

| | | | | |
|---|---|---|---|---|
| 2014/0092830 A1* | 4/2014 | Chen | H04L 5/0053 | 370/329 |
| 2015/0078272 A1* | 3/2015 | Kim | H04W 72/23 | 370/329 |
| 2015/0280878 A1* | 10/2015 | Lee | H04L 5/0048 | 370/252 |
| 2018/0115966 A1* | 4/2018 | Chen | H04L 5/0053 | |
| 2018/0167946 A1* | 6/2018 | Si | H04L 5/00 | |
| 2018/0213477 A1 | 7/2018 | Wilson et al. | | |
| 2018/0227777 A1* | 8/2018 | Sun | H04L 5/0094 | |
| 2018/0227922 A1* | 8/2018 | Lee | H04W 28/22 | |
| 2019/0007163 A1* | 1/2019 | Sun | H04L 5/0053 | |
| 2019/0068348 A1* | 2/2019 | Nam | H04L 5/0053 | |
| 2019/0075553 A1* | 3/2019 | Sun | H04L 1/0067 | |
| 2019/0150187 A1* | 5/2019 | Park | H04L 5/0094 | 370/330 |
| 2020/0213989 A1 | 7/2020 | Choi et al. | | |
| 2020/0275419 A1 | 8/2020 | Wang et al. | | |
| 2021/0153202 A1 | 5/2021 | Takeda et al. | | |

FOREIGN PATENT DOCUMENTS

| | | |
|---|---|---|
| CN | 107071905 | 8/2017 |
| WO | WO-2017/118178 A1 | 7/2017 |
| WO | WO-2018/227543 A1 | 12/2018 |

OTHER PUBLICATIONS

Extended European Search Report for EP Appl. No. 18862857.2, dated Jun. 29, 2021 (12 pages).
First Office Action for CN Appl. No. 201710940914, dated Nov. 25, 2020 (with English translation, 16 pages).
First Office Action for JP Appl. No. 2020-517894, dated Jul. 20, 2021 (8 pages).
Huawei et al.: "Resource multiplexing between PDCCH and PDSCH" 3GPP TSG RAN WG1 Meeting AH_NR#3; R1-1715566; Sep. 21, 2017; Nagoya, Japan (8 pages).
Intel Corporation: "Dynamic resource sharing of control and data channel" 3GPP TSG RAN WG1 Meeting #90; R1-1712571; Aug. 25, 2017; Prague, P.R. Czechia (5 pages).
International Searcn Report and Written Opinion of the International Searching Autnority tor PCT/CN2018/104754 dated Dec. 5, 2018 (9 pages).
LG Electronics: "Discussion on rate matching" 3GPP TSG RAN WG1 Meeting NR#3; R1-1715856; Sep. 21, 2017; Nagoya, Japan (8 pages).
MCC Support: "Draft Report of 3GPP TSG RAN WGl #AH_NR3 v0.1.0" 3GPP TSG RAN WG1 Meeting #90bis; R1-171xxxx; Oct. 13, 2017; Prague, Czech Rep (103 pages).
Nokia et al.: "Resource sharing between PDCCH and PDSCH in NR" 3GPP TSG-RAN WG1 #90; R1-1714098; Aug. 25, 2017; Prague, Czech Republic (5 pages).
Notice of Allowance on U.S. Appl. No. 16/830,113 dated Aug. 24, 2021.
Panasonic, "Resource sharing between PDCCH and PDSCH", 3GPP TSG RAN WG1 Meeting #90, R1-1713869 Prague, Czechia, Jun. 21-25, 2017 (3 pages).
Samsung: "Multiplexing NR-PDCCH and PDSCH" 3GPP TSG RAN WG1 Meeting #90; R1-1713615 Prague, Czechia; Aug. 25, 2017 (4 pages).
Samsung: "Multiplexing NR-PDCCH and PDSCH" 3GPP TSG RAN WG1 Meeting NR #3; R1-1715980; Sep. 21, 2017; Nagoya, Japan (6 pages).
Zte et al.: "WF on PDCCH/PDSCH resource sharing" 3GPP TSG RAN WG1 #90; R1-1715224; Aug. 26, 2017; Prague, Czech Republic (3 pages).
Catt, "Further details on multiplexing of PDCCH and PDSCH" 3GPP TSG RAN WG1 Meeting NR#3, R1-1715814, Sep. 2017, Nagoya, Japan (3 pages).
First Office Action for KR Appl. No. 10-2020-7012262, dated Jan. 21, 2022 (with English translation, 11 pages).
Intel Corporation, "Resource sharing between PDCCH and PDSCH", 3GPP TSG RAN WG1 Meeting NR#3, R1-1716307, Sep. 21, 2017, Nagoya, Japan (5 pages).
Nokia et al., "Resource sharing between PDCCH and PDSCH in NR", 3GPP TSG-RAN WG1 NRAH #3, R1-1715750, Sep. 21, 2017, Nagoya, Japan (6 pages).
Samsung, "Multiplexing NR-PDCCH and PDSCH", 3GPP TSG RAN WG1 NR Ad-Hoc#2, R1-1710696, Jun. 30, 2017, Qingdao, P.R. China (6 pages).
Wilus Inc., "PDSCH starting position indication for NR", 3GPP TSG RAN WG1 Meeting #90, R1-1714388, Aug. 25, 2017, Prague, Czech Republic (5 pages).

* cited by examiner

METHOD AND DEVICE FOR DETERMINING TIME FREQUENCY RESOURCES

CROSS-REFERENCE TO RELATED APPLICATIONS

This application claims the benefit of priority under 35 U.S.C. § 120 as a continuation of U.S. patent application Ser. No. 16/830,113, filed on Mar. 25, 2020, which is a continuation of PCT Patent Application No. PCT/CN2018/104754, filed on Sep. 10, 2018, which claims priority to Chinese patent application no. 201710940914.X, filed on Sep. 30, 2017, the disclosure of each of which is incorporated herein by reference in its entirety.

TECHNICAL FIELD

The present disclosure relates to communications and, specifically, to a method and device for determining time-frequency resources.

BACKGROUND

In the related art, in a new radio (NR) system, it has been determined currently that a base station can semi-statically configure some resource sets. Resources in these resource sets can be dynamically multiplexed to a physical downlink shared channel (PDSCH) transmission, and specifically resources of which resource sets can be multiplexed to the PDSCH transmission is indicated through dynamic signaling.

In the related art, in a physical downlink control channel (PDSCH) of a Long Term Evolution (LTE) system, a frequency domain will be mapped to a full bandwidth, and the number of orthogonal frequency division multiplexing (OFDM) symbols occupied by the PDCCH in a time domain is indicated through a physical control format indicator channel (PCFICH). Therefore, a PDCCH domain is a frequency domain full bandwidth, the time domain occupies a structure of several OFDM symbols in front of a sub-frame, time-frequency resources of the PDCCH domain are completely separated from time-frequency resources of the PDSCH domain, and resources in the PDCCH domain cannot be used for the PDSCH transmission.

In an LTE enhanced PDCCH (ePDCCH), the ePDCCH is transmitted on a physical resource block (PRB) set, that is, the ePDCCH and the PDSCH adopt a frequency division multiplexing mode. Resources in the PRB set are not used for the ePDCCH transmission but still can be used for the PDSCH transmission, and a "Resource Block assignment" domain in downlink control information (DCI) may include an indication for this part of resources, so that a terminal may know allocation of all resources for the PDSCH transmission.

For an NR PDCCH, based on several current discussions of 3GPP RAN1 conferences, the design will be performed based on a control resource set (referred to as CORESET for short). Different from a characteristic of full bandwidth distribution in the LTE PDCCH, the distribution of downlink control channels in the NR is limited by CORESET(s) configured by the system, the CORESET is semi-statically configured while user scheduling itself is dynamically changed, so when idle resources remain in the CORESET, in order to avoid resource waste, these resources can be used for the PDSCH transmission. Therefore, how to indicate multiplexed CORESET resources to a user to let the user know that there is a PDSCH service on these control resources is a problem to be solved.

Furthermore, the 3GPP RAN1 has approved that the base station semi-statically configures several resource sets to dynamically indicate whether resources in the resource set can be multiplexed to the scheduled PDSCH transmission or whether the scheduled PDSCH transmission needs to perform rate matching on part of resources of the resource set.

No efficient solution has been provided to solve the problem in the related art of how to indicate time-frequency resources used by the PDSCH transmission.

SUMMARY

Embodiments of the present disclosure provide a method, device for determining time-frequency resources to at least solve the problem in the related art of how to indicate time-frequency resources used by the PDSCH transmission.

According to an embodiment of the present disclosure, a method for determining time-frequency resources is provided. The method includes: determining, by a first communication node, at least one piece of the following information about a first resource set for a second communication node: time-frequency resources of a second resource set contained in the first resource set, configuration information of the second resource set contained in the first resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to implement rate matching; and transmitting the information to the second communication node, where the PDSCH transmission includes a process in which the first communication node transmits data to the second communication node through a PDSCH, and the PUSCH transmission includes a process in which the second communication node transmits data to the first communication node through a PUSCH.

Optionally, the first resource set is one of the following information: one or more resource sets or uplink control channel resources or uplink reservation resources, or complete or partial resource sets or uplink control channel resources or uplink reservation resources; one or more CORESETs or uplink control channel resources or uplink reservation resources, or complete or partial CORESETs or uplink control channel resources or uplink reservation resources; and one or more specific signal resources or specific channel resources, where the specific signal resource or the specific channel resource includes one or more of the following: a reference signal time domain resource, a reference signal frequency domain resource, a synchronizing signal time domain resource, a synchronizing signal frequency domain resource, a broadcast channel time domain resource, and a broadcast channel frequency domain resource.

Optionally, the second resource set includes one of the following information: one or more CORESETs or uplink control channel resources or uplink reservation resources, or complete or partial CORESETs or uplink control channel resources or uplink reservation resources; and one or more specific signal resources or specific channel resources, where the specific signal resource or the specific channel resource includes one or more of the following: a reference signal time domain resource, a reference signal frequency domain resource, a synchronizing signal time domain resource, a synchronizing signal frequency domain resource, a broadcast channel time domain resource, and a broadcast channel frequency domain resource.

Optionally, the first communication node configures one or more first resource sets for a second communication node, and time-frequency resources of multiple configured first resource sets are forbidden to partially overlap or forbidden to completely overlap.

Optionally, when the first communication node configures multiple first resource sets for the second communication node, the first communication node configures priorities for part or all of the multiple first resource sets.

Optionally, when time-frequency resources of the multiple first resource sets overlap, whether the overlapped time-frequency resources are allowed to be multiplexed to the PDSCH transmission or the PUSCH transmission or whether the PDSCH transmission or the PUSCH transmission needs to perform rate matching around the overlapped time-frequency resources is determined through following manner: the determination is made according to a dynamic signaling indication of a first resource set having a higher priority.

Optionally, the first resource set for the second communication node includes one of the following: part of time domain resources in a time domain resource unit are configured as the first resource set; and part of frequency domain resources in a frequency domain resource unit are configured as the first resource set.

Optionally, the first resource set for the second communication node includes at least one of the following: in a time domain, part of time domain resources of a periodically configured time domain resource unit are configured as the first resource set; the time domain resource unit is shifted; in a frequency domain, part of frequency domain resources in a frequency domain resource unit within a designated subcarrier range are configured as the first resource set; and in the frequency domain, part of frequency domain resources in a frequency domain resource unit within a designated bandwidth range are configured as the first resource set.

Optionally, when an overlap occurs in time-frequency resources of multiple first resource sets, whether the overlapped time-frequency resources are allowed to be multiplexed to the PDSCH transmission or the PUSCH transmission or whether the PDSCH transmission or the PUSCH transmission needs to perform rate matching around the overlapped time-frequency resources is determined through following manner: an AND operation or an OR operation is performed on dynamic signaling indications of all multiple overlapping first resource sets; and the determination is made according results of the AND operation or the OR operation.

Optionally, the following information is agreed: the dynamic signaling indication being set to 1 is agreed to indicate that all or part of the corresponding first resource set is allowed to be multiplexed to the PDSCH transmission or the PUSCH transmission, or that the PDSCH transmission or the PUSCH transmission does not need to perform rate matching around all or part of resources in the corresponding first resource set; and the dynamic signaling indication being set to 0 is agreed to indicate that all or part of the corresponding first resource set is forbidden to be multiplexed to the PDSCH transmission or the PUSCH transmission, or that the PDSCH transmission or the PUSCH transmission needs to perform rate matching around all or part of resources in the corresponding first resource set; and the step that the AND operation or the OR operation is performed on dynamic signaling indications of all multiple overlapping first resource sets, and the determination is made according results of the AND operation or the OR operation includes: performing the OR operation on dynamic signaling indications of the multiple overlapping first resource sets; and determining whether the overlapped time-frequency resources are allowed to be multiplexed to the PDSCH transmission or the PUSCH transmission or whether the PDSCH transmission or the PUSCH transmission needs to perform rate matching around the overlapped time-frequency resources according to results of the OR operation.

Optionally, in condition that the dynamic signaling indication being set to 1 is agreed to indicate that all or part of the corresponding first resource set is forbidden to be multiplexed to the PDSCH transmission or the PUSCH transmission or that the PDSCH transmission or the PUSCH transmission needs to perform rate matching around all or part of time-frequency resources in the corresponding first resource set, and the dynamic signaling indication being set to 0 is agreed to indicate that all or part of the corresponding first resource set is allowed to be multiplexed to the PDSCH transmission or the PUSCH transmission or that the PDSCH transmission or the PUSCH transmission does not need to perform rate matching around all or part of time-frequency resources in the corresponding first resource set, the method further includes: performing the AND operation on dynamic signaling indications of the multiple overlapping first resource sets; and determining whether the overlapped time-frequency resources are allowed to be multiplexed to the PDSCH transmission or the PUSCH transmission or whether the PDSCH transmission or the PUSCH transmission needs to perform rate matching around the overlapped time-frequency resources according to results of the AND operation.

Optionally, when an overlap occurs in time-frequency resources of multiple first resource sets, the following information is determined through different manner for different types of the first resource sets: information about whether the overlapped time-frequency resources are allowed to be multiplexed to the PDSCH transmission or the PUSCH transmission or whether the PDSCH transmission or the PUSCH transmission needs to perform rate matching around the overlapped time-frequency resources; where the different types of the first resource sets include one of the following: time-frequency resource configuration manners being different, time-frequency resource configuration ranges being different, time-frequency resource configuration granularities being different, and time-frequency resource configuration priorities being different.

Optionally, when the first resource set contains multiple second resource sets or is equivalent to multiple second resource sets, multiple second resource sets included in the same first resource set needs to meet at least one of the following characteristics: blind detection moment configurations or blind detection period configurations of the second communication node in the multiple second resource sets are the same; levels of blind detection moment configurations or blind detection period configurations of the multiple second resource sets are the same and are a slot level, where levels of blind detection moment configurations or blind detection period configurations of the multiple second resource sets being the slot level is configured to indicate one of the following: each of the blind detection moment configurations or each of the period configurations is a slot, and each of the blind detection moment configurations or each of the period configurations is at intervals of multiple slots; levels of blind detection moment configurations or blind detection period configurations of the multiple second resource sets are the same and are a mini-slot level, where levels of blind detection moment configurations or blind detection period configurations of the multiple second resource sets being the mini-slot level is configured to indicate one of the following: each of the blind detection moment configurations or each of the period configurations is a mini-slot, and each of the blind detection moment configurations or each of the period configurations is at intervals of multiple mini-slots; levels of blind detection moment configurations or blind detection period configurations of the multiple second resource sets are the same and are an OFDM symbol level, where levels of blind detection moment configurations or blind detection period configurations of the multiple second resource sets being the OFDM symbol level is configured to indicate one of the following: each of the blind detection moment configurations or each of the period configurations is an OFDM symbol, and each of the blind detection moment configurations or each of the period configurations is at intervals of multiple OFDM symbols; blind detection moment configurations or blind detection period configurations of the multiple second resource sets need meet an inclusion relationship, where the inclusion relationship is that: for a second resource set having a sparse number of times of blind detections or a sparse period configuration and a second resource set having an intensive number of times of blind detections or an intensive period configuration, a blind detection moment or period configuration of the former is a subset of a blind detection moment or period configuration of the latter; and the number of times of occurrence of blind detection moment configurations or blind detection period configurations of the multiple second resource sets in a fixed time unit is the same, where the fixed time unit includes one of the following: a radio frame, a sub-frame, a slot, a PDCCH domain or an uplink control channel range of a slot, and a fixed number of several OFDM symbols at fixed locations of a slot.

Optionally, the dynamic signaling indication is a multiplexing or rate matching dynamic signaling indication for the first resource set, where a valid time domain range of the multiplexing or rate matching dynamic signaling indication for the first resource set is determined to be one of the following: time-frequency resources corresponding to a first blind detection moment or a first period configuration moment when the first resource set is overlapped with resources used by the transmission of the PDSCH or the PUSCH; time-frequency resources corresponding to all blind detection moments or all period configuration moments when the first resource set is overlapped with resources used by the transmission of the PDSCH or the PUSCH; time-frequency resources corresponding to all blind detection moments or all period configuration moments when the first resource set is overlapped with resources used by the transmission of the PDSCH or the PUSCH in a PDCCH domain or an uplink control channel resource range; a valid time domain range determined according to results of a blind detection performed by the second communication node on time-frequency resources where the first resource set is overlapped with resources used by the transmission of the PDSCH or the PUSCH; a first sub-frame or a first slot where the first resource set is overlapped with resources used by the transmission of the PDSCH or the PUSCH; and all sub-frames or all slots where the first resource set is overlapped with resources used by the transmission of the PDSCH or the PUSCH.

Optionally, the PDCCH domain is allowed to be one of the following levels: a sub-frame level, a slot level, a mini-slot level, and an OFDM symbol level; where in response to determining that the PDCCH domain is the sub-frame level, the PDCCH domain or the uplink control channel resource range is first several OFDM symbols of a sub-frame; in response to determining that the PDCCH domain is the slot level, the PDCCH domain or the uplink control channel resource range is first several OFDM symbols of a slot; in response to determining that the PDCCH domain is the mini-slot level, the PDCCH domain or the uplink control channel resource range is first several OFDM symbols of a mini-slot or several OFDM symbols at fixed locations of a slot; and in response to determining that the PDCCH domain is the OFDM symbol level, the PDCCH domain or the uplink control channel resource range is OFDM symbols at preset fixed locations.

Optionally, when results of the blind detection of the second communication node are that a PDCCH sent to the second communication node is detected, the method further includes: performing, by the second communication node, rate matching around time-frequency resources occupied by the detected PDCCH sent to the second communication node, and for remaining resources other than the time-frequency resources occupied by the PDCCH sent to the second communication node, the multiplexing or rate matching dynamic signaling indication being valid for the following moments: the blind detection moment, and resources where the first resource set overlaps resources used by the PDSCH transmission; or the multiplexing or rate matching dynamic signaling indication being invalid for the first resource set at the blind detection moment; where at the blind detection moment, all or part of time-frequency resources where the first resource set overlaps resources used by the PDSCH transmission are forbidden to be multiplexed to the PDSCH transmission, or at the blind detection moment, the PDSCH transmission needs to perform rate matching around all or part of time-frequency resources where the first resource set overlaps resources used by the PDSCH transmission.

Optionally, when results of the blind detection of the second communication node are that a PDCCH sent to the second communication node is not detected, the method further includes: the multiplexing or rate matching dynamic signaling indication being valid for the first resource set at the blind detection moment; or the multiplexing or rate matching dynamic signaling indication being invalid for the first resource set at the blind detection moment; where at the blind detection moment, all or part of time-frequency resources where the first resource set overlaps resources used by the PDSCH transmission are allowed to be multiplexed to the PDSCH transmission, or the PDSCH transmission does not need to perform rate matching around all or part of time-frequency resources where the first resource set overlaps resources used by the PDSCH transmission at the blind detection moment.

Optionally, the first communication node sends a dynamic indication for activating or inactivating the dynamic signaling indication to the second communication node.

Optionally, the first communication node determines the following information about the first resource set for the second communication node: dynamic signaling indication for indicating whether the first resource set is multiplexed to a PDSCH transmission or a PUSCH transmission or whether the PDSCH transmission or the PUSCH transmission needs to perform rate matching; and after the above step is executed, the first communication node sends one or more dynamic signaling indications to the second communication node for a first resource set or a group of first resource sets.

Optionally, a first resource set corresponding to the dynamic signaling indication is determined in one of the following manners: a semi-static configuration manner and a dynamic determination manner; where the dynamic signaling indication is allowed to correspond to different first resource sets in different time units, or is allowed to correspond to different numbers of first resource sets in different time units; where the time unit includes one of the following: a slot, a mini-slot, an OFDM symbol, and a sub-frame.

Optionally, part or all of bits of the dynamic signaling indication are allowed to indicate at least one of the following meanings: the part or all of bits are used for indicating at least one piece of the following information of a first resource set corresponding to an adjacent bit or an adjacent bit group: a situation of multiplexing or rate matching after a time domain split is performed, a situation of multiplexing or rate matching after a frequency domain split is performed, and a situation of multiplexing or rate matching after a space domain split is performed; the part or all of bits are used for indicating at least one piece of the following information of a specific first resource set: a situation of multiplexing or rate matching after a time domain split is performed, a situation of multiplexing or rate matching after a frequency domain split is performed, and a situation of multiplexing or rate matching after a space domain split is performed, where the specific first resource set is allowed to be one of the following: a first resource set on which the second communication node needs to perform a blind detection, a first resource set where a PDCCH for scheduling the PDSCH transmission or the PUSCH transmission is located, a first resource set sent by the dynamic signaling indication, and a specific first resource set semi-statically configured by the first communication node; the part or all of bits are used for indicating one of the following information of all first resource sets corresponding to other bits or bit groups: a situation of multiplexing or rate matching after a time domain split is performed, a situation of multiplexing or rate matching after a frequency domain split is performed, and a situation of multiplexing or rate matching after a space domain split is performed; the part or all of bits are used for indicating whether at least one of following conditions occurs in a subsequent time unit: activation of a carrier or a bandwidth part, deactivation of a carrier or a bandwidth part, and handover of a carrier or a bandwidth part; and the part or all of bits are used for indicating whether a length of a dynamic signaling indication sent by a subsequent time unit changes.

Optionally, the split includes: at least one of the following of the first resource set is split equally: a time domain, a frequency domain and a space domain; where n equal split is determined to be performed according to the number of redundant bits, and n is a positive integer; and after the equal split is performed, non-redundant bits and redundant bits jointly indicate which equally split parts of the first resource set are capable of being multiplexed to the PDSCH transmission or the PUSCH transmission, or on which equally split parts the PDSCH or the PUSCH does not need to perform rate matching; where the redundant bit is part or all of the bits.

According to another embodiment of the present disclosure, another method for determining time-frequency resources is further provided. The method includes: receiving, by a second communication node, information about a first resource set transmitted by a first communication node, where the information includes at least one of the following: time-frequency resources of a second resource set included in the first resource set, configuration information of the second resource set included in the first resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to perform rate matching; and determining one of the following configuration information according to the information: time-frequency resources allowed to be multiplexed to the PDSCH transmission or the PUSCH transmission and time-frequency resources on which the PDSCH transmission or the PUSCH transmission does not need to perform rate matching; where the PDSCH transmission includes a process of data transmission through a PDSCH, and the PUSCH transmission includes a process of data transmission through a PUSCH.

Optionally, the first resource set is one of the following information: one or more resource sets or uplink control channel resources or uplink reservation resources, or complete or partial resource sets or uplink control channel resources or uplink reservation resources; one or more CORESETs or uplink control channel resources or uplink reservation resources, or complete or partial CORESETs or uplink control channel resources or uplink reservation resources; and one or more specific signal resources or specific channel resources, where the specific signal resource or the specific channel resource includes one of the following: a reference signal resource, a synchronizing signal resource, and a broadcast channel resource.

Optionally, the second resource set includes one of the following information: one or more CORESETs or uplink control channel resources or uplink reservation resources, or complete or partial CORESETs or uplink control channel resources or uplink reservation resources; and one or more specific signal resources or specific channel resources, where the specific signal resource or the specific channel resource includes one of the following: a reference signal resource, a synchronizing signal resource, and a broadcast channel resource.

Optionally, the dynamic signaling indication is a multiplexing or rate matching dynamic signaling indication for the first resource set, where a valid time domain range of the multiplexing or rate matching dynamic signaling indication for the first resource set is determined to be one of the following: time-frequency resources corresponding to a first blind detection moment or a first period configuration moment when the first resource set is overlapped with resources used by the transmission of the PDSCH or the PUSCH; time-frequency resources corresponding to all blind detection moments or all period configuration moments when the first resource set is overlapped with resources used by the transmission of the PDSCH or the PUSCH; time-frequency resources corresponding to all blind detection moments or all period configuration moments when the first resource set is overlapped with resources used by the transmission of the PDSCH or the PUSCH in a PDCCH domain or an uplink control channel resource range;

a valid time domain range determined according to results of a blind detection performed by the second communication node on time-frequency resources where the first resource set is overlapped with resources used by the transmission of the PDSCH or the PUSCH; a first sub-frame or a first slot where the first resource set is overlapped with resources used by the transmission of the PDSCH or the PUSCH; and all sub-frames or all slots where the first resource set is overlapped with resources used by the transmission of the PDSCH or the PUSCH.

Optionally, the second communication node performs the blind detection, where when results of the blind detection of the second communication node are that a PDCCH sent to the second communication node is detected, the method further includes: performing, by the second communication node, rate matching around time-frequency resources occupied by the detected PDCCH sent to the second communication node, and for remaining resources other than the time-frequency resources occupied by the PDCCH sent to the second communication node, determining, by the second communication node, that the multiplexing or rate matching dynamic signaling indication is valid for the following moments: the blind detection moment, and resources where the first resource set overlaps resources used by the PDSCH transmission; or determining, by the second communication node, that the multiplexing or rate matching dynamic signaling indication is invalid for the first resource set at the blind detection moment; where at the blind detection moment, all or part of time-frequency resources where the first resource set overlaps resources used by the PDSCH transmission are forbidden to be multiplexed to the PDSCH transmission, or the PDSCH transmission needs to perform rate matching around all or part of time-frequency resources where the first resource set overlaps resources used by the PDSCH transmission at the blind detection moment.

Optionally, the second communication node performs the blind detection, where when results of the blind detection of the second communication node are that a PDCCH sent to the second communication node is not detected, the method further includes: the multiplexing or rate matching dynamic signaling indication being valid for the first resource set at the blind detection moment; or the multiplexing or rate matching dynamic signaling indication being invalid for the first resource set at the blind detection moment; where at the blind detection moment, all or part of time-frequency resources where the first resource set overlaps resources used by the PDSCH transmission are allowed to be multiplexed to the PDSCH transmission, or the PDSCH transmission does not need to perform rate matching around all or part of time-frequency resources where the first resource set overlaps resources used by the PDSCH transmission at the blind detection moment.

According to another embodiment of the present disclosure, a device for determining time-frequency resources is further provided. The device includes: a first determination module, which is configured to determine at least one piece of the following information about a first resource set for a second communication node: time-frequency resources of a second resource set included in the first resource set, configuration information of the second resource set included in the first resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to perform rate matching; and a transmission module, which is configured to transmit the information to the second communication node, where the PDSCH transmission includes a process of data transmission through a PDSCH, and the PUSCH transmission includes a process of data transmission through a PUSCH.

According to another embodiment of the present disclosure, a device for determining time-frequency resources is further provided. The device includes: a reception module, which is configured to receive information about a first resource set transmitted by a first communication node, where the information includes at least one of the following: time-frequency resources of a second resource set included in the first resource set, configuration information of the second resource set included in the first resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to perform rate matching; and a second determination module, which is configured to determine one of the following configuration information according to the information: time-frequency resources allowed to be multiplexed to the PDSCH transmission and time-frequency resources on which the PDSCH transmission does not need to perform rate matching; where the PDSCH transmission includes a process in which data is transmitted through a PDSCH, and the PUSCH transmission includes a process in which data is transmitted to the first communication node through a PUSCH.

According to another embodiment of the present disclosure, a base station is further provided. The base station includes: a first processor, which is configured to determine at least one piece of the following information about a first resource set for a second communication node: time-frequency resources of a second resource set included in the first resource set, configuration information of the second resource set included in the first resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to perform rate matching; and a first communication device, which is configured to transmit the information to the second communication node, where the PDSCH transmission includes a process in which data is transmitted to the second communication node through a PDSCH, and the PUSCH transmission includes a process in which the second communication node transmits data to the first communication node through a PUSCH.

According to another embodiment of the present disclosure, a terminal is further provided. The terminal includes: a second communication device, which is configured to receive information about a first resource set transmitted by a first communication node, where the information includes at least one of the following: time-frequency resources of a second resource set included in the first resource set, configuration information of the second resource set included in the first resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to perform rate matching; and a second processor, which is configured to determine one of the following configuration information according to the information: time-frequency resources allowed to be multiplexed to the PDSCH transmission and time-frequency resources on which the PDSCH transmission does not need to perform rate matching; where the PDSCH transmission includes a process of data transmission through a PDSCH, and the PUSCH transmission includes a process of data transmission through a PUSCH.

According to another embodiment of the present disclosure, a storage medium is further provided. The storage medium includes stored programs which, when executed, perform the method of any one of the embodiments described above.

According to another embodiment of the present disclosure, a processor is further provided. The processor is configured to execute programs which, when executed, perform the method of any one of the embodiments described above.

Through the present disclosure, a first determination module determines at least one piece of the following information about a first resource set for a second communication node: time-frequency resources of a second resource set included in the first resource set, configuration information of the second resource set included in the first resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to perform rate matching; after the information is determined, the information is transmitted to the second communication node, and the second communication node determines time-frequency resources used during the PDSCH transmission or the PUSCH transmission according to the information. The above technical solution resolves the problem in the related art of how to indicate time-frequency resources used during the PDSCH transmission or the PUSCH transmission, implementing the indication of the time-frequency resources used during the PDSCH transmission or the PUSCH transmission to a user.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure. In the drawings.

DETAILED DESCRIPTION

An embodiment of the present application provides a mobile communication network (which includes, but is not limited to a 5-th generation (5G) mobile communication network). The network architecture of this network may include a network side device (such as a base station) and a terminal. An information transmission method executable on the above network architecture is provided in the embodiment. It is to be noted that an execution environment of the above information transmission method provided by the embodiment of the present application is not limited to the above network architecture.

In the present application, a first communication node may be a base station side device, and a second communication node may be a terminal side device.

Embodiment One

Figure 1:
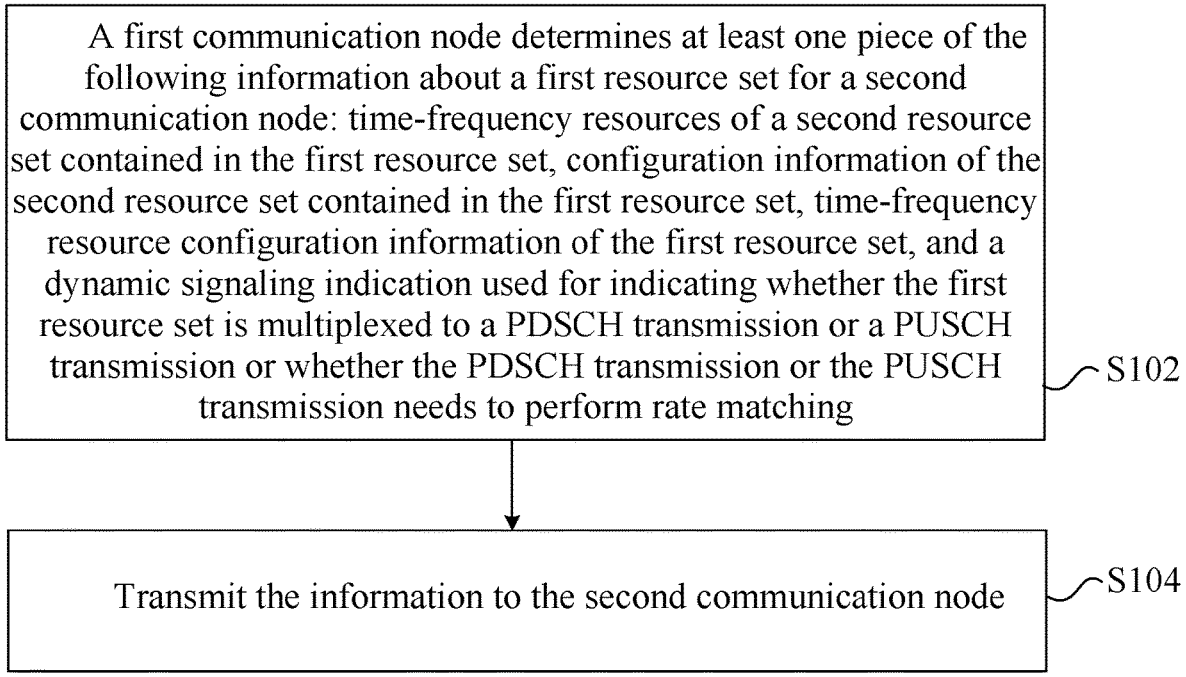
FIG. 1 is a flowchart of a method for determining time-frequency resources according to an embodiment of the present disclosure.

A method for determining time-frequency resources is provided in the embodiment, which is executed on the above mobile terminal network architecture. FIG. 1 is a flowchart of a method for determining time-frequency resources according to an embodiment of the present disclosure. As shown in FIG. 1, the method includes the steps described below.

In step S102, a first communication node determines at least one piece of the following information about a first resource set for a second communication node: time-frequency resources of a second resource set included in the first resource set, configuration information of the second resource set included in the first resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to perform rate matching.

In step S104, the information is transmitted to the second communication node, where the PDSCH transmission includes a process in which the first communication node transmits data to the second communication node through a PDSCH, and the PUSCH transmission includes a process in which the second communication node transmits data to the first communication node through a PUSCH.

Through the above steps, the first communication node determines the information about the first resource set for the second communication node; the information is transmitted to the second communication node after the above information is determined, and the second communication node determines time-frequency resources used during the PDSCH transmission according to the information. The above technical solution resolves the problem in the related art of how to indicate time-frequency resources used during the PDSCH transmission, implementing the indication of the time-frequency resources used during the PDSCH transmission to a user.

Optionally, the above steps may, but may not necessarily, be executed by a base station.

Optionally, the first resource set is one of the following information: one or more resource sets or uplink control channel resources or uplink reservation resources, or complete or partial resource sets or uplink control channel resources or uplink reservation resources; one or more CORESETs or uplink control channel resources or uplink reservation resources, or complete or partial CORESETs or uplink control channel resources or uplink reservation resources; and one or more specific signal resources or specific channel resources, where the specific signal resource or the specific channel resource includes one or more of the following: a reference signal time domain resource, a reference signal frequency domain resource, a synchronizing signal time domain resource, a synchronizing signal frequency domain resource, a broadcast channel time domain resource, and a broadcast channel frequency domain resource.

Optionally, the second resource set includes one of the following information: one or more CORESETs or uplink control channel resources or uplink reservation resources, or complete or partial CORESETs or uplink control channel resources or uplink reservation resources; and one or more specific signal resources or specific channel resources, where the specific signal resource or the specific channel resource includes one or more of the following: a reference signal time domain resource, a reference signal frequency domain resource, a synchronizing signal time domain resource, a synchronizing signal frequency domain resource, a broadcast channel time domain resource, and a broadcast channel frequency domain resource.

Optionally, the first communication node configures one or more first resource sets for a second communication node, and time-frequency resources of multiple configured first resource sets are forbidden to partially overlap or forbidden to completely overlap.

Optionally, when the first communication node configures multiple first resource sets for the second communication node, the first communication node configures priorities for part or all of the multiple first resource sets.

Optionally, when time-frequency resources of the multiple first resource sets overlap, whether the overlapped time-frequency resources are allowed to be multiplexed to the PDSCH transmission or the PUSCH transmission or whether the PDSCH transmission or the PUSCH transmission needs to perform rate matching around the overlapped time-frequency resources is determined through following manner: the determination is made according to a dynamic signaling indication of a first resource set having a higher priority.

Optionally, the first resource set for the second communication node includes one of the following: part of time domain resources in a time domain resource unit are configured as the first resource set; and part of frequency domain resources in a frequency domain resource unit are configured as the first resource set. It is to be added that the time domain resource unit in this optional embodiment may be a slot, a sub-frame or the like, and part of time domain resources may be a certain number of OFDM symbols in a certain slot. The frequency domain resource unit may be a bandwidth with a determined size. For example, the frequency domain resource unit may be N megahertz, or M PRBs or Y resource block groups (RBGs), where N, M and Y are positive integers.

The time domain resource unit and the frequency domain resource unit may be configured in one of the following manners: a system pre-configuration, a semi-static configuration of a first communication node (which may be a base station), and a dynamic configuration of a first communication node (which may be a base station).

Optionally, the first resource set for the second communication node includes at least one of the following: in a time domain, part of time domain resources of a periodically configured time domain resource unit are configured as the first resource set; the time domain resource unit is shifted; in a frequency domain, part of frequency domain resources in a frequency domain resource unit within a designated sub-carrier range are configured as the first resource set; and in the frequency domain, part of frequency domain resources in a frequency domain resource unit within a designated bandwidth range are configured as the first resource set. It is to be added that this optional embodiment indicates that the first resource set may be periodically configured, that is, it is assumed that a fixed time domain resource is one slot or a group of slots, that is, a certain number of OFDM symbols in each slot or a group of slots are selected to form the first resource set. Similarly, in the frequency domain, a certain number of frequency domain resource units in a certain sub-carrier range may also be periodically configured to form the first resource set. The reference may be made to an embodiment seventeen.

Optionally, when an overlap occurs in time-frequency resources of multiple first resource sets, whether the overlapped time-frequency resources are allowed to be multiplexed to the PDSCH transmission or the PUSCH transmission or whether the PDSCH transmission or the PUSCH transmission needs to perform rate matching around the overlapped time-frequency resources is determined through following manner: an AND operation or an OR operation is performed on dynamic signaling indications of all multiple overlapping first resource sets, and the determination is made according results of the AND operation or the OR operation.

Optionally, the following information is agreed: the dynamic signaling indication being set to 1 is agreed to indicate that all or part of the corresponding first resource set is allowed to be multiplexed to the PDSCH transmission or the PUSCH transmission, or that the PDSCH transmission or the PUSCH transmission does not need to perform rate matching around all or part of resources in the corresponding first resource set; and the dynamic signaling indication being set to 0 is agreed to indicate that all or part of the corresponding first resource set is forbidden to be multiplexed to the PDSCH transmission or the PUSCH transmission, or that the PDSCH transmission or the PUSCH transmission needs to perform rate matching around all or part of resources in the corresponding first resource set; and the step that the AND operation or the OR operation is performed on dynamic signaling indications of all multiple overlapping first resource sets, and the determination is made according results of the AND operation or the OR operation includes: performing the OR operation on dynamic signaling indications of the multiple overlapping first resource sets, and determining whether the overlapped time-frequency resources are allowed to be multiplexed to the PDSCH transmission or the PUSCH transmission or whether the PDSCH transmission or the PUSCH transmission needs to perform rate matching around the overlapped time-frequency resources according to results of the OR operation.

Optionally, in condition that the dynamic signaling indication being set to 1 is agreed to indicate that all or part of the corresponding first resource set is forbidden to be multiplexed to the PDSCH transmission or the PUSCH transmission or that the PDSCH transmission or the PUSCH transmission needs to perform rate matching around all or part of time-frequency resources in the corresponding first resource set, and the dynamic signaling indication being set to 0 is agreed to indicate that all or part of the corresponding first resource set is allowed to be multiplexed to the PDSCH transmission or the PUSCH transmission or that the PDSCH transmission or the PUSCH transmission does not need to perform rate matching around all or part of time-frequency resources in the corresponding first resource set, the method further includes: performing the AND operation on dynamic signaling indications of the multiple overlapping first resource sets, and determining whether the overlapped time-frequency resources are allowed to be multiplexed to the PDSCH transmission or the PUSCH transmission or whether the PDSCH transmission or the PUSCH transmission needs to perform rate matching around the overlapped time-frequency resources according to results of the AND operation.

Optionally, when an overlap occurs in time-frequency resources of multiple first resource sets, the following information is determined through different manner for different types of the first resource sets: information about whether the overlapped time-frequency resources are allowed to be multiplexed to the PDSCH transmission or the PUSCH transmission or whether the PDSCH transmission or the PUSCH transmission needs to perform rate matching around the overlapped time-frequency resources; where the different types of the first resource sets include one of the following: time-frequency resource configuration manners being different, time-frequency resource configuration ranges being different, time-frequency resource configuration granularities being different, and time-frequency resource configuration priorities being different.

Optionally, when the first resource set contains multiple second resource sets or is equivalent to multiple second resource sets (it is to be noted herein that being equivalent to the multiple second resource sets may include the following case: a first resource set does not contain multiple second resource sets while time-frequency resources of a first resource set are configured, but these time-frequency resources, in fact, are multiple time-frequency resources corresponding to the multiple second resource sets, which is marked as being equivalent to the multiple second resource sets), multiple second resource sets included in the same first resource set needs to meet at least one of the following characteristics: blind detection moment configurations or blind detection period configurations of the second communication node in the multiple second resource sets are the same; levels of blind detection moment configurations or blind detection period configurations of the multiple second resource sets are the same and are a slot level, where levels of blind detection moment configurations or blind detection period configurations of the multiple second resource sets being the slot level is configured to indicate one of the following: each of the blind detection moment configurations or each of the period configurations is a slot, and each of the blind detection moment configurations or each of the period configurations is at intervals of multiple slots; levels of blind detection moment configurations or blind detection period configurations of the multiple second resource sets are the same and are a mini-slot level, where levels of blind detection moment configurations or blind detection period configurations of the multiple second resource sets being the mini-slot level is configured to indicate one of the following: each of the blind detection moment configurations or each of the period configurations is a mini-slot, and each of the blind detection moment configurations or each of the period configurations is at intervals of multiple mini-slots; levels of blind detection moment configurations or blind detection period configurations of the multiple second resource sets are the same and are an OFDM symbol level, where levels of blind detection moment configurations or blind detection period configurations of the multiple second resource sets being the OFDM symbol level is configured to indicate one of the following: each of the blind detection moment configurations or each of the period configurations is an OFDM symbol, and each of the blind detection moment configurations or each of the period configurations is at intervals of multiple OFDM symbols; blind detection moment configurations or blind detection period configurations of the multiple second resource sets need meet an inclusion relationship, where the inclusion relationship is that: for a second resource set having a sparse number of times of blind detections or a sparse period configuration and a second resource set having an intensive number of times of blind detections or an intensive period configuration, a blind detection moment or period configuration of the former is a subset of a blind detection moment or period configuration of the latter; and the number of times of occurrence of blind detection moment configurations or blind detection period configurations of the multiple second resource sets in a fixed time unit is the same, where the fixed time unit includes one of the following: a radio frame, a sub-frame, a slot, a PDCCH domain or an uplink control channel range of a slot, and a fixed number of several OFDM symbols at fixed locations of a slot.

Optionally, the dynamic signaling indication is a multiplexing or rate matching dynamic signaling indication for the first resource set, where a valid time domain range of the multiplexing or rate matching dynamic signaling indication for the first resource set is determined to be one of the following: time-frequency resources corresponding to a first blind detection moment or a first period configuration moment when the first resource set is overlapped with resources used by the transmission of the PDSCH or the PUSCH; time-frequency resources corresponding to all blind detection moments or all period configuration moments when the first resource set is overlapped with resources used by the transmission of the PDSCH or the PUSCH; time-frequency resources corresponding to all blind detection moments or all period configuration moments when the first resource set is overlapped with resources used by the transmission of the PDSCH or the PUSCH in a PDCCH domain or an uplink control channel resource range; a valid time domain range determined according to results of a blind detection performed by the second communication node on time-frequency resources where the first resource set is overlapped with resources used by the transmission of the PDSCH or the PUSCH; a first sub-frame or a first slot where the first resource set is overlapped with resources used by the transmission of the PDSCH or the PUSCH; and all sub-frames or all slots where the first resource set is overlapped with resources used by the transmission of the PDSCH or the PUSCH.

Optionally, the PDCCH domain or the uplink control channel resource range is allowed to be one of the following levels: a sub-frame level, a slot level, a mini-slot level, and an OFDM symbol level; where in response to determining that the PDCCH domain or the uplink control channel resource range is the sub-frame level, the PDCCH domain or the uplink control channel resource range is first several OFDM symbols of a sub-frame; in response to determining that the PDCCH domain or the uplink control channel resource range is the slot level, the PDCCH domain or the uplink control channel resource range is first several OFDM symbols of a slot; in response to determining that the PDCCH domain or the uplink control channel resource range is the mini-slot level, the PDCCH domain or the uplink control channel resource range is first several OFDM symbols of a mini-slot or several OFDM symbols at fixed locations of a slot; and in response to determining that the PDCCH domain or the uplink control channel resource range is the OFDM symbol level, the PDCCH domain or the uplink control channel resource range is OFDM symbols at preset fixed locations.

Optionally, when results of the blind detection of the second communication node are that a PDCCH sent to the second communication node is detected, the method further includes: performing, by the second communication node, rate matching around time-frequency resources occupied by the detected PDCCH sent to the second communication node, and for remaining resources other than the time-frequency resources occupied by the PDCCH sent to the second communication node, the multiplexing or rate matching dynamic signaling indication being valid for the following moments: the blind detection moment, and resources where the first resource set overlaps resources used by the PDSCH transmission; or the multiplexing or rate matching dynamic signaling indication being invalid for the first resource set at the blind detection moment; where at the blind detection moment, all or part of time-frequency resources where the first resource set overlaps resources used by the PDSCH transmission are forbidden to be multiplexed to the PDSCH transmission, or at the blind detection moment, the PDSCH transmission needs to perform rate matching around all or part of time-frequency resources where the first resource set overlaps resources used by the PDSCH transmission.

Optionally, when results of the blind detection of the second communication node are that a PDCCH sent to the second communication node is not detected, the method further includes: the multiplexing or rate matching dynamic signaling indication being valid for the first resource set at the blind detection moment; or the multiplexing or rate matching dynamic signaling indication being invalid for the first resource set at the blind detection moment; where at the blind detection moment, all or part of time-frequency resources where the first resource set overlaps resources used by the PDSCH transmission are allowed to be multiplexed to the PDSCH transmission, or the PDSCH transmission does not need to perform rate matching around all or part of time-frequency resources where the first resource set overlaps resources used by the PDSCH transmission at the blind detection moment.

Optionally, the first communication node sends a dynamic indication for activating or inactivating the dynamic signaling indication to the second communication node.

Optionally, the first communication node determines the following information about the first resource set for the second communication node: dynamic signaling indication for indicating whether the first resource set is multiplexed to a PDSCH transmission or a PUSCH transmission or whether the PDSCH transmission or the PUSCH transmission needs to perform rate matching; and after the above step is executed, the first communication node sends one or more dynamic signaling indications to the second communication node for a first resource set or a group of first resource sets.

Optionally, a first resource set corresponding to the dynamic signaling indication is determined in one of the following manners: a semi-static configuration manner and a dynamic determination manner; where the dynamic signaling indication is allowed to correspond to different first resource sets in different time units, or is allowed to correspond to different numbers of first resource sets in different time units; where the time unit includes one of the following: a slot, a mini-slot, an OFDM symbol, and a sub-frame.

Optionally, part or all of bits of the dynamic signaling indication are allowed to indicate at least one of the following meanings: the part or all of bits are used for indicating at least one piece of the following information of a first resource set corresponding to an adjacent bit or an adjacent bit group: a situation of multiplexing or rate matching after a time domain split is performed, a situation of multiplexing or rate matching after a frequency domain split is performed, and a situation of multiplexing or rate matching after a space domain split is performed; the part or all of bits are used for indicating at least one piece of the following information of a specific first resource set: a situation of multiplexing or rate matching after a time domain split is performed, a situation of multiplexing or rate matching after a frequency domain split is performed, and a situation of multiplexing or rate matching after a space domain split is performed, where the specific first resource set is allowed to be one of the following: a first resource set on which the second communication node needs to perform a blind detection, a first resource set where a PDCCH for scheduling the PDSCH transmission or the PUSCH transmission is located, a first resource set sent by the dynamic signaling indication, and a specific first resource set semi-statically configured by the first communication node; the part or all of bits are used for indicating one of the following information of all first resource sets corresponding to other bits or bit groups: a situation of multiplexing or rate matching after a time domain split is performed, a situation of multiplexing or rate matching after a frequency domain split is performed, and a situation of multiplexing or rate matching after a space domain split is performed; the part or all of bits are used for indicating whether at least one of following conditions occur in a subsequent time unit: activation of a carrier or a bandwidth part, deactivation of a carrier or a bandwidth part, and handover of a carrier or a bandwidth part; and the part or all of bits are used for indicating whether a length of a dynamic signaling indication sent by a subsequent time unit changes.

Optionally, the split includes: at least one of the following of the first resource set is split equally: a time domain, a frequency domain and a space domain; where n equal split is determined to be performed according to the number of redundant bits, and n is a positive integer; and after the equal split is performed, non-redundant bits and redundant bits jointly indicate which equally split parts of the first resource set are capable of being multiplexed to the PDSCH transmission or the PUSCH transmission, or on which equally split parts the PDSCH or the PUSCH does not need to perform rate matching; where the redundant bit is part or all of the bits.

According to another embodiment of the present disclosure, another method for determining time-frequency resources is further provided. The method includes steps described below.

In step 1, a second communication node receives information about a first resource set transmitted by a first communication node, where the information includes at least one of the following: time-frequency resources of a second resource set included in the first resource set, configuration information of the second resource set included in the first resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to perform rate matching.

In step 2, one of the following configuration information is determined according to the information: time-frequency resources allowed to be multiplexed to the PDSCH transmission or the PUSCH transmission and time-frequency resources on which the PDSCH transmission or the PUSCH transmission does not need to perform rate matching; where the PDSCH transmission includes a process in which data is transmitted to the second communication node through a PDSCH, and the PUSCH transmission includes a process in which the second communication node transmits data to the first communication node through a PUSCH.

Optionally, the first resource set is one of the following information: one or more resource sets or uplink control channel resources or uplink reservation resources, or complete or partial resource sets or uplink control channel resources or uplink reservation resources; one or more CORESETs or uplink control channel resources or uplink reservation resources, or complete or partial CORESETs or uplink control channel resources or uplink reservation resources; and one or more specific signal resources or specific channel resources, where the specific signal resource or the specific channel resource includes one of the following: a reference signal resource, a synchronizing signal resource, and a broadcast channel resource.

Optionally, the second resource set includes one of the following information: one or more complete or partial CORESETs; and one or more specific signal resources or specific channel resources, where the specific signal resource or the specific channel resource includes one of the following: a reference signal resource, a synchronizing signal resource, and a broadcast channel resource.

Optionally, the dynamic signaling indication is a multiplexing or rate matching dynamic signaling indication for the first resource set, where a valid time domain range of the multiplexing or rate matching dynamic signaling indication for the first resource set is determined to be one of the following: time-frequency resources corresponding to a first blind detection moment or a first period configuration moment when the first resource set is overlapped with resources used by the transmission of the PDSCH or the PUSCH; time-frequency resources corresponding to all blind detection moments or all period configuration moments when the first resource set is overlapped with resources used by the transmission of the PDSCH or the PUSCH; time-frequency resources corresponding to all blind detection moments or all period configuration moments when the first resource set is overlapped with resources used by the transmission of the PDSCH or the PUSCH in a PDCCH domain or an uplink control channel resource range;

a valid time domain range determined according to results of a blind detection performed by the second communication node on time-frequency resources where the first resource set is overlapped with resources used by the transmission of the PDSCH or the PUSCH; a first sub-frame or a first slot where the first resource set is overlapped with resources used by the transmission of the PDSCH or the PUSCH; and all sub-frames or all slots where the first resource set is overlapped with resources used by the transmission of the PDSCH or the PUSCH.

Optionally, the second communication node performs the blind detection, where when results of the blind detection of the second communication node are that a PDCCH sent to the second communication node is detected, the method further includes: performing, by the second communication node, rate matching around time-frequency resources occupied by the detected PDCCH sent to the second communication node, and for remaining resources other than the time-frequency resources occupied by the PDCCH sent to the second communication node, determining, by the second communication node, that the multiplexing or rate matching dynamic signaling indication is valid for the following moments: the blind detection moment, and resources where the first resource set overlaps resources used by the PDSCH transmission; or determining, by the second communication node, that the multiplexing or rate matching dynamic signaling indication is invalid for the first resource set at the blind detection moment; where at the blind detection moment, all or part of time-frequency resources where the first resource set overlaps resources used by the PDSCH transmission are forbidden to be multiplexed to the PDSCH transmission, or the PDSCH transmission needs to perform rate matching around all or part of time-frequency resources where the first resource set overlaps resources used by the PDSCH transmission at the blind detection moment.

Optionally, the second communication node performs the blind detection, where when results of the blind detection of the second communication node are that a PDCCH sent to the second communication node is not detected, the method further includes: the multiplexing or rate matching dynamic signaling indication being valid for the first resource set at the blind detection moment; or the multiplexing or rate matching dynamic signaling indication being invalid for the first resource set at the blind detection moment; where at the blind detection moment, all or part of time-frequency resources where the first resource set overlaps resources used by the PDSCH transmission are allowed to be multiplexed to the PDSCH transmission, or the PDSCH transmission does not need to perform rate matching around all or part of time-frequency resources where the first resource set overlaps resources used by the PDSCH transmission at the blind detection moment.

The present disclosure will be described below in conjunction with exemplary embodiments.

Embodiment One

The base station semi-statically configures multiple resource sets for the terminal and may configure the multiple resource sets through RRC signaling. Time-frequency resources of the multiple configured resource sets do not overlap.

When the base station configures resource sets for the terminal, the base station needs to configure time-frequency resources occupied by the resource sets in a time-frequency resource unit, and also needs to configure time-frequency resource units in which the resource sets appear or time-frequency resource units in which the terminal monitors the resource sets. The time domain configuration in the time-frequency unit may be configured through at least one of the following: a period, a time unit offset and a time unit pattern. The frequency domain configuration of the time-frequency resource unit may be configured through at least one of the following: a carrier, a bandwidth part (BWP) in the carrier, several RBGs on the BWP in the carrier and several PRBs on the BWP in the carrier.

If the base station does not configure the time-frequency resource unit in which the resource sets appear, the terminal may consider that the resource sets appear in each time-frequency resource unit, or the terminal needs to monitor the resource sets in all time-frequency resource units.

Embodiment Two

Figure 2:
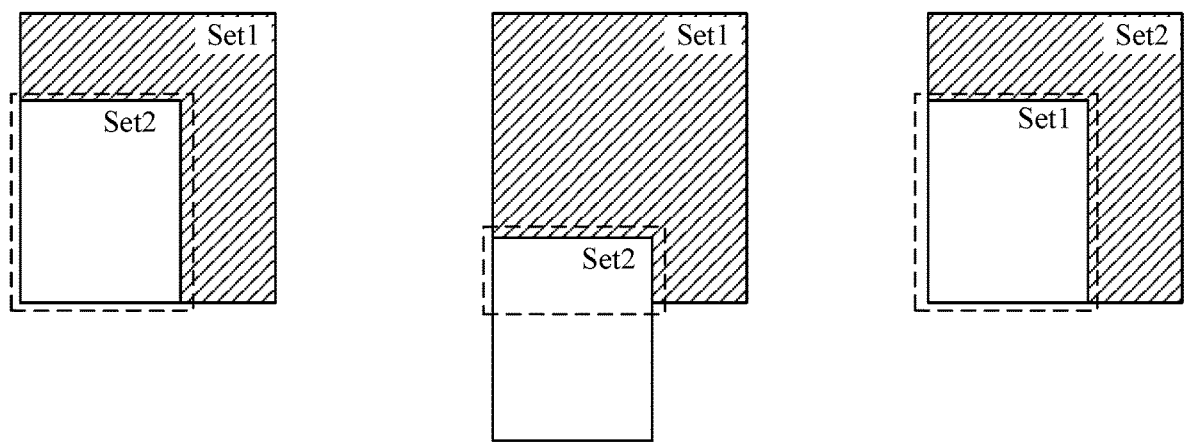
FIG. 2 is a schematic diagram of partial overlap or complete overlap according to an exemplary embodiment.

The base station semi-statically configures multiple resource sets for the terminal and may configure the multiple resource sets through RRC signaling. Time-frequency resources of the multiple configured resource sets may overlap. The overlap herein may be partial overlap, or may be complete overlap. FIG. 2 is a schematic diagram of partial overlap or complete overlap according to an exemplary embodiment. As shown in FIG. 2, from left to right, complete overlap, partial overlap and complete overlap are shown respectively.

When the base station configures the resource sets, the base station may indicate a priority of each resource set or priorities of resource sets where resources overlap in an explicit or implicit manner.

As an example, the explicit manner may be to pre-configure by a system or semi-statically configure a priority sequence number x of the resource set, where x is an integer, and priority sequence numbers from small to large indicate that priorities are from high to low, or priority sequence numbers from large to small indicate that priorities are from high to low.

In another example, the explicit manner may be to pre-configure by a system or semi-statically configure resource sets meeting a characteristic 1 as high priorities and remaining resource sets failing to the characteristic 1 as low priorities.

The characteristic 1 may be, but is not limited to, one of the following: a resource set containing all or part of time-frequency resources meeting a characteristic 2; and a resource set whose configuration manner meets a characteristic 3.

The characteristic 2 may be, but is not limited to, one of the following: being a specific or dedicated time-frequency resource, such as a time-frequency resource occupied by a certain reference signal (RS), which for example, may be a synchronizing signal, a channel state indication-RS (CSI-RS), a sounding reference signal (SRS), a demodulation reference signal (DMRS), a phase tracking reference signal (PTRS), etc., and a time-frequency resource occupied by a certain public channel, which for example, may be a physical broadcast channel (PBCH), a channel bearing system information, etc.; and being a reservation resource.

The characteristic 3 may be, but is not limited to, one of the following: containing a certain configuration granularity, such as resource element (RE)-level configuration granularity and a resource block (RB)-level configuration granularity; configuration signaling being a certain specific format; and configuration signaling being a certain specific length or greater than a certain length.

The implicit manner may be that a resource set index itself represents a priority sequence, the resource set indexes from low to high represent that priorities are from high to low, or the resource set indexes from high to low represent that priorities are from high to low.

When the dynamic signaling indicates whether a PDSCH resource needs to perform rate matching on the resource set or part of resources of the resource set, for multiple resource sets where resources overlap, if dynamic signaling indications of the multiple resource sets are consistent, that is, their dynamic signaling indications all indicate that rate matching needs to be performed or the rate matching does not need to be performed, the rate matching of the PDSCH is performed according to the dynamic signaling indications; and if their dynamic signaling indications are inconsistent, rate matching needs to be performed on some resource sets or part of resources thereof, and rate matching does not need to be performed on some resource sets or part of resources thereof, which is determined according to indications of the resource sets with high priority or part of resources thereof. Whether rate matching needs to be performed is determined based on the indication of the resource sets with high priority or part of resources thereof.

Embodiment Three

The base station semi-statically configures multiple resource sets for the terminal and may configure the multiple resource sets through RRC signaling.

The base station sends a dynamic signaling indication to the terminal to indicate a PDSCH transmission corresponding to a certain scheduling, resources of which resource sets may be occupied by the overlapped PDSCH, that is, rate matching does not need to be performed, and resources of which resource sets cannot be occupied by the PDSCH, that is, rate matching needs to be performed.

For multiple resource sets where resources overlap, if dynamic signaling indications are different, then for the overlap area, as long as the dynamic signaling indication of at least one of resource sets indicates that rate matching does not need to be performed, rate matching of the PDSCH does not need to be performed on the overlap area. Only when dynamic signaling indications of all resource sets where overlapping occurs indicate that rate matching needs to be performed, rate matching of the PDSCH needs to be performed on the overlap area.

If a dynamic signaling indication corresponding to a certain resource set being set to "1" indicates that rate matching does not need to be performed and the dynamic signaling indication being set to "0" indicates that rate matching needs to be performed, for the overlap area of multiple resource sets, a OR operation is performed according to the dynamic signaling indication of each resource set which belongs to the overlap area, and whether resource multiplexing or rate matching needs to be performed on the overlap area is determined according to results of the OR operation: if the result of the OR operation is "1", rate matching does not need to be performed on the overlap area, and if the result of the OR operation is "0", rate matching needs to be performed on the overlap area.

If a dynamic signaling indication corresponding to a certain resource set being set to "1" indicates that rate matching needs to be performed and the dynamic signaling indication being set to "0" indicates that rate matching does not need to be performed, for the overlap area of multiple resource sets, an AND operation is performed according to the dynamic signaling indication of each resource set which belongs to the overlap area, and whether resource multiplexing or rate matching needs to be performed on the overlap area is determined according to results of the AND operation: if the result of the AND operation is "0", rate matching does not need to be performed on the overlap area, and if the result of the AND operation is "1", rate matching needs to be performed on the overlap area.

Figure 3:
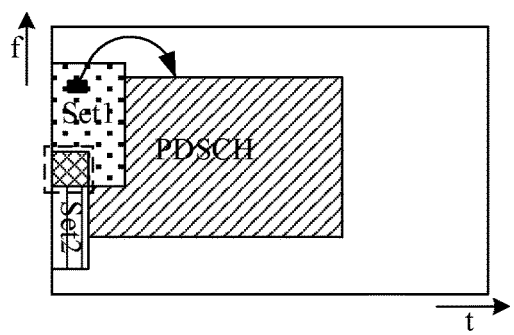
FIG. 3 is a schematic diagram of a dynamic indication manner according to an exemplary embodiment of the present disclosure.

In this embodiment, FIG. 3 is a schematic diagram of a dynamic indication manner according to an exemplary embodiment of the present disclosure. As shown in FIG. 3, a black block in Resource set 1 denotes a PDCCH scheduling the PDSCH. For a PDCCH resource scheduling the PDSCH, regardless of whether the PDSCH needs to perform rate matching on other resources of a resource set where the PDCCH resource is located, the PDSCH needs to perform rate matching around time-frequency resources occupied by the PDCCH scheduling the PDSCH. In addition, if the terminal blindly detects a common PDCCH or a group-common PDCCH in a certain resource set, regardless of whether the PDSCH needs to perform rate matching on the resource set, the PDSCH needs to perform rate matching around time-frequency resources occupied by at least one of the common PDCCH and the group-common PDCCH.

Embodiment Four

The base station semi-statically configures multiple resource sets for the terminal and may configure the multiple resource sets through RRC signaling.

The base station sends a dynamic signaling indication to the terminal to indicate a PDSCH transmission corresponding to a certain scheduling, resources of which resource sets may be occupied by the overlapped PDSCH, that is, rate matching does not need to be performed, and resources of which resource sets cannot be occupied by the PDSCH, that is, rate matching needs to be performed. The dynamic signaling indication may be valid on part of OFDM symbols of one slot.

Figure 4:
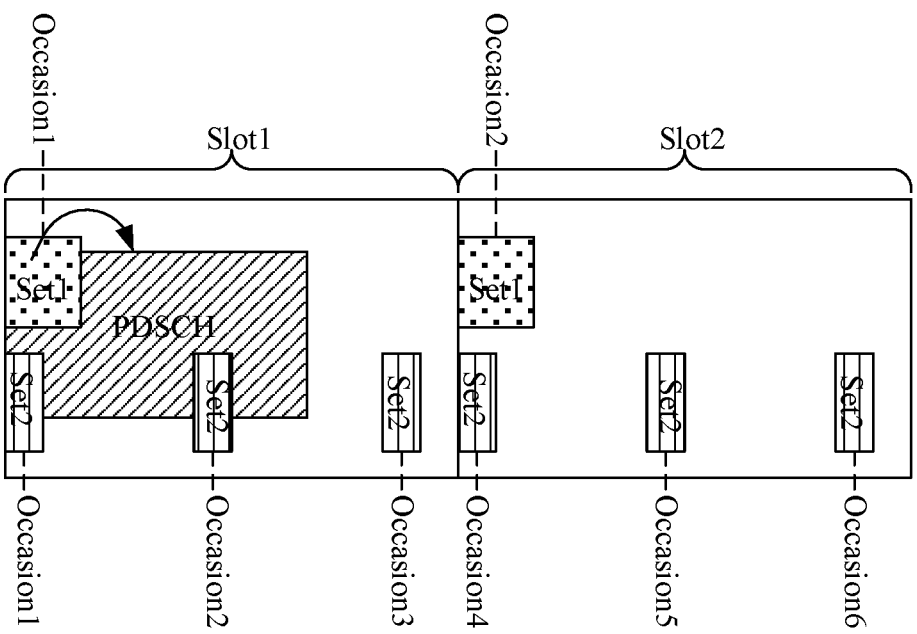
FIG. 4 is a schematic diagram according to an embodiment 4.

FIG. 4 is a schematic diagram according to an embodiment 4. As shown in FIG. 4, a PDCCH scheduling the PDSCH is sent in Resource set 1, and a dynamic signaling indication indicating whether the PDSCH multiplexes resources of the semi-statically configured resource sets is sent in this PDCCH or another PDCCH. Assuming that the dynamic signaling indication for Resource set 1 is "1", which indicates that all or part of time-frequency resources of Resource set 1 may be multiplexed by the PDSCH, the PDSCH does not need to perform rate matching on all or part of time-frequency resources of Resource set 1. When a dynamic signaling indication of Resource set 2 is "0", which indicates that all or part of time-frequency resources of Resource set 2 may not be multiplexed by the PDSCH, the PDSCH needs to perform rate matching on all or part of time-frequency resources of Resource set 2.

Resource set 1 and Resource set 2 have their own monitor occasion configuration. The monitor occasion configuration of Resource set 1 is in a slot level. For example, each slot needs to be monitored or each several slots need to be monitored. One slot only has one monitor occasion at most. The monitor occasion configuration of Resource set 2 is in a min-slot level or an OFDM symbol level, and one slot may have multiple monitor occasions.

The dynamic signaling indications of Resource set 1 and Resource set 2 are valid on only one monitor occasion. For example, the monitor occasion may be a first monitor occasion where Resource set 1, Resource set 2 and resource allocation of the PDSCH overlap in a slot where a PDSCH transmission corresponding to the dynamic signaling indication is located. Using FIG. 4 as an example, for Resource set 1, the valid monitor occasion is Occasion 1 of Resource set 1, and for Resource set 2, the valid monitor occasion is Occasion 1 of Resource set 2.

Embodiment Five

Still using FIG. 4 as an example, in a corresponding resource set, the dynamic signaling indications of Resource set 1 and Resource set 2 are valid on all monitor occasions which overlap resource allocation of a corresponding PDSCH. For example, the all monitor occasions may be all monitor occasions where Resource set 1, Resource set 2 and resource allocation of the PDSCH overlap in a slot where a PDSCH transmission corresponding to the dynamic signaling indication is located. Using FIG. 4 as an example, for Resource set 1, the valid monitor occasion is Occasion 1 of Resource set 1, and for Resource set 2, the valid monitor occasion is Occasion 1 and Occasion 2 of Resource set 2.

Embodiment Six

Figure 5:
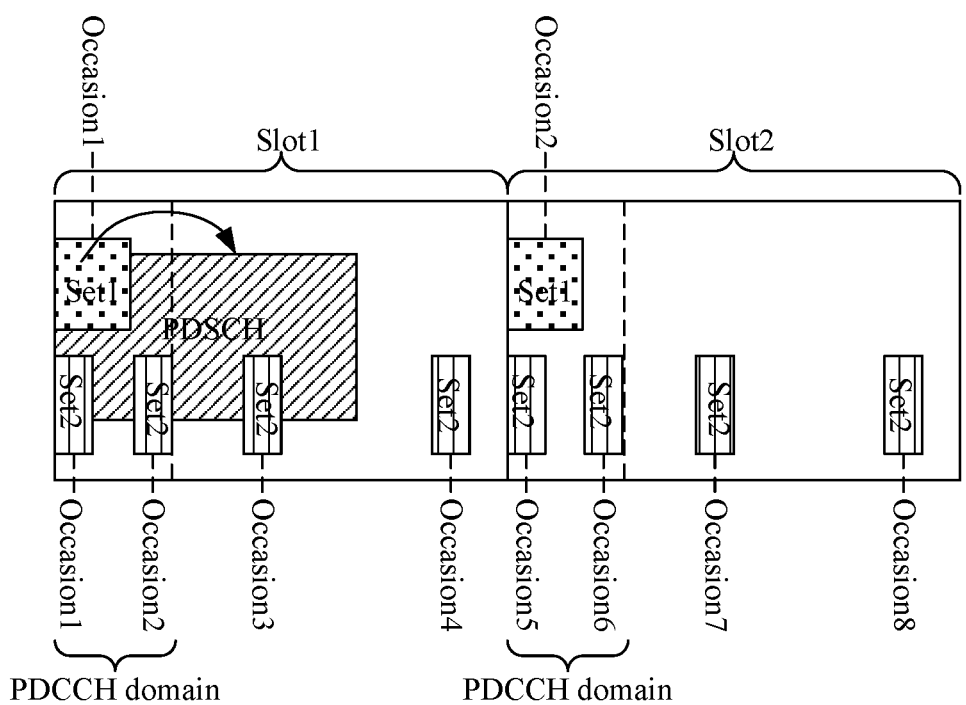
FIG. 5 is a schematic diagram according to an embodiment 6.

FIG. 5 is a schematic diagram according to an embodiment 6. As shown in FIG. 5, in a corresponding resource set, the dynamic signaling indications of Resource set 1 and Resource set 2 are valid on all monitor occasions which overlap resource allocation of a corresponding PDSCH. A PDCCH domain usually is first several OFDM symbols of one slot. In the PDCCH domain, dynamic signaling indications are valid on all monitor occasions where Resource set 1, Resource set 2 and resource allocation of the PDSCH overlap. Using FIG. 5 as an example, for Resource set 1, the valid monitor occasion is Occasion 1 of Resource set 1, and for Resource set 2, the valid monitor occasion is Occasion 1 and Occasion 2 of Resource set 2. Occasion 3 also overlaps resource allocation of the PDSCH, but since Occasion 3 is not within the PDCCH domain, the dynamic signaling indication is not valid in Occasion 3 of Resource set 2.

Embodiment Seven

Still using FIG. 4 as an example, for the dynamic signaling indications of Resource set 1 and Resource set 2, their valid ranges are related to the blind detection of the terminal. For example, in a corresponding resource set, the dynamic signaling indications are valid on a first monitor occasion which overlaps resource allocation of a corresponding PDSCH. In FIG. 4, the first monitor occasion in Resource set 1 is Occasion 1, and the first monitor occasion in Resource set 2 is Occasion 1. For other monitor occasions which overlap resource allocation of the PDSCH, for example, Occasion 2 of Resource set 2 in FIG. 4, whether the dynamic signaling indication is valid depends on results of the blind detection performed by the terminal on the resource set in a corresponding monitor occasion.

The blind detection includes the following.

1) If the terminal does not blindly detect a PDCCH sent by the base station to the terminal itself on a corresponding occasion, time-frequency resources of a corresponding resource set on this occasion, which overlap resource allocation of a corresponding PDSCH, may be used for the PDSCH transmission, that is, the terminal does not need to perform rate matching on the PDSCH in corresponding time-frequency resources, which is not related to the dynamic signaling indication; or the indication of the dynamic signaling indication for this resource set continues to be valid.

2) If the terminal detects the PDCCH sent by the base station to the terminal itself on a corresponding occasion, a corresponding resource set cannot be used for the PDSCH transmission on this occasion, that is, the terminal needs to perform rate matching on the PDSCH in corresponding time-frequency resources, which is not related to the dynamic signaling indication.

Alternatively, in the corresponding resource set on this occasion, when the terminal blindly detects resources other than time-frequency resources occupied by the PDCCH, the indication of the dynamic signaling indication for this resource set continues to be valid.

Embodiment Eight

Using FIG. 5 as an example, for the dynamic signaling indications of Resource set 1 and Resource set 2, their valid ranges are related to the blind detection of the terminal. For example, in a corresponding resource set, the dynamic signaling indication is valid on all monitor occasions which overlap resource allocation of a corresponding PDSCH. In FIG. 5, the valid monitor occasion in Resource set 1 is Occasion 1, and the valid monitor occasion in Resource set 2 is Occasion 1 and Occasion 2. For other monitor occasions which overlap resource allocation of the PDSCH, for example, Occasion 3 of Resource set 2 in FIG. 5, whether the dynamic signaling indication is valid depends on results of the blind detection performed by the terminal on the resource set on a corresponding monitor occasion.

The result of the blind detection is as follows.

1) If the terminal does not blindly detect a PDCCH sent by the base station to the terminal itself on a corresponding occasion, time-frequency resources of a corresponding resource set on this occasion, which overlap resource allocation of a corresponding PDSCH, may be used for the PDSCH transmission, that is, the terminal does not need to perform rate matching on the PDSCH in corresponding time-frequency resources, which is not related to the dynamic signaling indication; or the indication of the dynamic signaling indication for this resource set continues to be valid.

2) If the terminal detects the PDCCH sent by the base station to the terminal itself on a corresponding occasion, a corresponding resource set cannot be used for the PDSCH transmission on this occasion, that is, the terminal needs to perform rate matching on the PDSCH in corresponding time-frequency resources, which is not related to the dynamic signaling indication.

Alternatively, in the corresponding resource set on this occasion, when the terminal blindly detects resources other than time-frequency resources occupied by the PDCCH, the indication of the dynamic signaling indication for this resource set continues to be valid.

Embodiment Nine

Figure 6:
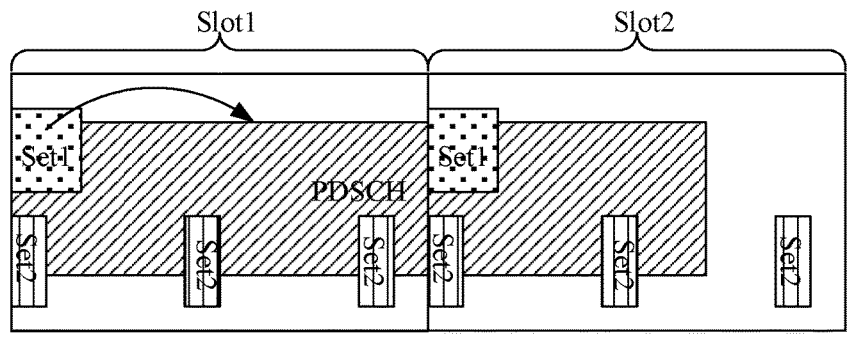
FIG. 6 is a schematic diagram according to an embodiment 9.

FIG. 6 is a schematic diagram according to an embodiment 9. As shown in FIG. 6, when a PDSCH scheduled in Resource set 1 occupies multiple slots, a multiplexing resource dynamic signaling indication which is sent by the base station to the terminal and corresponds to the PDSCH transmission is only valid in a first slot of resource allocation of the PDSCH, and is invalid in other slots of resource allocation of the PDSCH, that is, in FIG. 5, the dynamic signaling indication of Resource set 1 and Resource set 2 are only valid in Slot 1 and invalid in Slot 2.

Embodiment Ten

As shown in FIG. 6, when the PDSCH scheduled in Resource set 1 occupies multiple slots, a multiplexing resource dynamic signaling indication which is sent by the base station to the terminal and corresponds to the PDSCH transmission is valid in all slots included in resource allocation of the PDSCH, that is, in FIG. 5, the dynamic signaling indication of Resource set 1 and Resource set 2 are valid in both Slot 1 and Slot 2.

Embodiment Eleven

As shown in FIG. 6, when the PDSCH scheduled in Resource set 1 occupies multiple slots, a multiplexing resource dynamic signaling indication which is sent by the base station to the terminal and corresponds to the PDSCH transmission is valid in a first slot of resource allocation of the PDSCH, that is, this indication is valid in Slot 1 in FIG. 5; for other slots included in resource allocation of the PDSCH, that is, Slot 2 in FIG. 5, dynamic signaling 2 is required to be indicate. According to the indication of the dynamic singling 2, whether a corresponding resource set in Slot 2 may be multiplexed the PDSCH scheduled in Resource set 1 is determined. The dynamic singling 2 may be one of the following:

an indication indicating activation/inactivation of a dynamic signaling indication sent in Slot 1; and a new dynamic signaling indication, which is not related to the dynamic signaling indication sent in Slot 1, where an indicated resource set may be different from the dynamic signaling indication sent in Slot 1.

Embodiment Twelve

Figure 7:
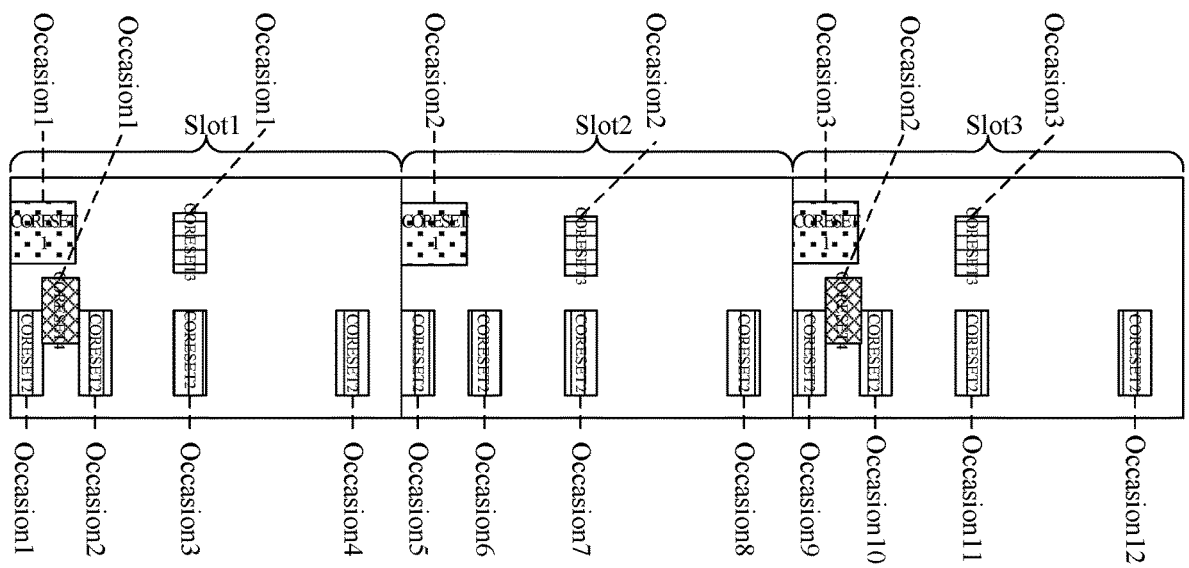
FIG. 7 is a schematic diagram according to an embodiment 12.

When a gNB configures time-frequency resources of a resource set, if one resource set contains multiple CORESETs, monitor occasions of the multiple CORESETs configured in the same resource set should meet a certain requirement. The requirement may be one or a more of the following:

1) a monitor occasion configuration of each CORESET is totally the same, that is, the CORESET is blindly detected on the same radio frame or sub-frame or slot or OFDM symbol;

2) a monitor occasion configuration level of each CORESET is the same and is a slot level, for example, the CORESET may be blindly detected on each slot or every multiple slots;

3) a monitor occasion configuration level of each CORESET is the same and is a mini-slot level, for example, the CORESET may be blindly detected on each mini-slot or every multiple mini-slots;

4) a monitor occasion configuration level of each CORESET is the same and is an OFDM symbol level, for example, the CORESET may be blindly detected on each OFDM symbol or every multiple OFDM symbols; and 5) a monitor occasion configuration of each CORESET needs to meet an inclusion relationship, for example, for a CORESET with a sparse number of times of blind detections and a CORESET with an intensive number of times of blind detections, blind detection moment of the former is a subset of blind detection moment of the latter. As shown in FIG. 7, CORESET 1 and CORESET 4 are configured in the same resource set, and since the monitor occasion of CORESET 1 is each slot while the monitor occasion of CORESET 4 is each odd slot, the monitor occasion of CORESET 4 is a sub-set of the monitor occasion of CORESET 1. CORESET 2 and CORESET 3 may be configured in the same resource set, and since the monitor occasion of CORESET 2 is OFDM symbols {0 2 5 12} of each slot while the monitor occasion of CORESET 3 is an OFDM symbol {5} of each slot, the monitor occasion of CORESET 3 is a sub-set of the monitor occasion of CORESET 2.

The number of times of appearance of the monitor occasion configuration of each CORESET in a fixed time unit is the same. For example, with one slot as the fixed time unit, CORESETs whose monitor occasion appears once in one slot may be configured in the same resource set. As shown in FIG. 7, CORESET 1 and CORESET 3 may be configured in the same resource set, because their monitor occasion appears once in one slot.

After a resource set containing multiple CORESETs is configured according to the above rule, a dynamic signaling indication for this resource set is valid in corresponding unit time, where the unit time may be a sub-frame or multiple sub-frames, or a slot or multiple slots, or a PDCCH domain of one slot or PDCCH domains of multiple slots, or a fixed number of OFDM symbols. In time-frequency resources which overlap resource allocation of the PDSCH, all monitor occasions of all CORESETs included in the resource set in the unit time follow the dynamic signaling indication.

Alternatively, after one resource set containing multiple CORESETs is configured according to the above rule, the dynamic signaling indication for this resource set is valid on a single monitor occasion. The single monitor occasion may be time-frequency resources corresponding to a first monitor occasion of each CORESET included in this resource set in time-frequency resources where the resource set overlaps resource allocation of the PDSCH.

Embodiment Thirteen

The base station semi-statically configures multiple resource sets for the terminal and may configure the multiple resource sets through RRC signaling.

The base station sends a dynamic signaling indication to the terminal to indicate a PDSCH transmission corresponding to a certain scheduling, resources of which resource sets may be occupied by the overlapped PDSCH, that is, rate matching does not need to be performed, and resources of which resource sets cannot be occupied by the PDSCH, that is, rate matching needs to be performed.

For the overlap area of multiple resource sets, the base station may configure a principle to determine whether the scheduled PDSCH transmission performs rate matching on the overlap area. The principle may be configured through RRC signaling or system information semi-statically or through the PDCCH dynamically.

Figure 8:
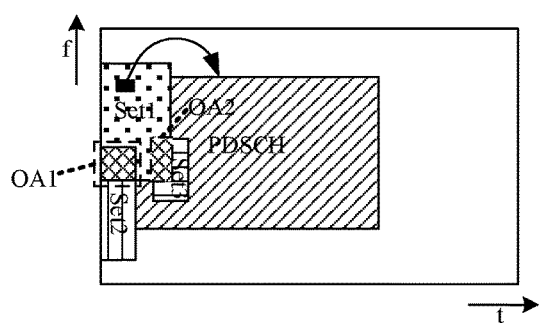
FIG. 8 is a schematic diagram 1 according to an embodiment 13.

For the overlap area of multiple resource sets, different principles may be adopted to determine whether the scheduled PDSCH transmission performs rate matching on the overlap area. For example, for different configuration manners or a resource set containing different types of time-frequency resources, different principles may be adopted. FIG. 8 is a schematic diagram 1 according to an embodiment thirteen. As shown in FIG. 8, when Resource set 1 and Resource set 2 are configured in a configuration manner 1 or configured as resource sets containing the type 1 of time-frequency resources and Resource set 3 is configured in a configuration manner 2 or configured as a resource set containing the type 2 of time-frequency resources, for an overlap area OA1 of Resource set 1 and Resource set 2, whether the PDSCH needs to perform rate matching on OA1 is determined according a principle 1, and for an overlap area OA2 of Resource set 1 and Resource set 3, whether the PDSCH needs to perform rate matching on OA2 is determined according a principle 2.

The principle 1 and the principle 2 may be one of the following.

1) In resource sets where overlapping occurs, as long as one resource set is indicated by the dynamic singling indication to be unable to be multiplexed by the PDSCH, the PDSCH needs to perform rate matching on the resource sets, and regardless of whether the PDSCH needs to perform rate matching on other resource sets, the overlap area cannot be multiplexed by the PDSCH, and the PDSCH needs to perform rate matching on the overlap area.

2) In resource sets where overlapping occurs, as long as one resource set is indicated by the dynamic singling indication to be able to be multiplexed by the PDSCH, the PDSCH does not need to perform rate matching on the resource sets, and regardless of whether the PDSCH needs to perform rate matching on other resource sets, the overlap area can be multiplexed by the PDSCH, and the PDSCH does not need to perform rate matching on the overlap area.

3) According to resource set priorities semi-statically configured or pre-configured by a system or resource set priorities which are equivalent to priorities semi-statically configured or pre-configured by the system, when a resource set having a high priority overlaps a resource set having a low priority, a dynamic signaling indication of the resource set having a high priority is followed to determine whether the overlap area can be multiplexed by the PDSCH and whether the PDSCH needs to perform rate matching on the overlap area.

Embodiment Fourteen

The dynamic singling indication may contain one or more bits for indicating whether one or more resource set time-frequency resources can be used by the scheduled PDSCH transmission or whether the scheduled PDSCH transmission needs to perform rate matching on resource set time-frequency resources. The resource set indicated by a certain one or multiple bits in the dynamic signaling indication may be semi-statically configured, or may be dynamically changed.

Figure 9:
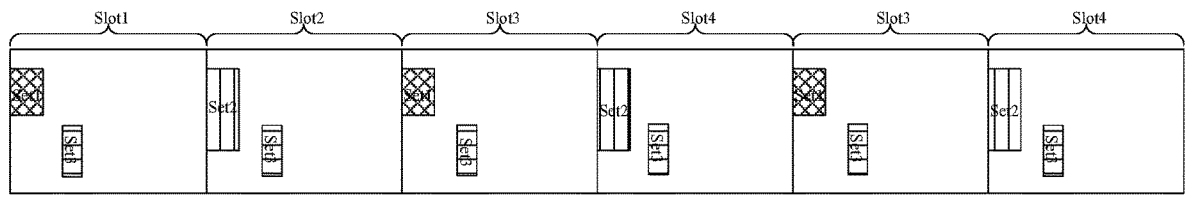
FIG. 9 is a schematic diagram 1 according to an Embodiment Fourteen.

FIG. 9 is a schematic diagram 1 according to an embodiment fourteen. As shown in FIG. 9, when the resource set is configured semi-statically, the base station may configure an x-th bit or bit group in dynamic signaling indications corresponding to Resource 1 and Resource 2 and configure a y-th bit or bit group in a dynamic signaling indication corresponding to Resource set 3 through RRC signaling or system information, where x and y are positive integers not greater than a length of the dynamic signaling indication. In one slot, time-frequency resources corresponding to Resource set 1 and Resource set 2 may be the same or different, and may be semi-statically configured by the base station through RRC signaling or system information. At least one of the following parameters of Resource set 1 and Resource set 2 is different: a configuration period, a time domain offset and a monitor occasion, and these parameters may also be semi-statically configured by the base station through RRC signaling or system information. Therefore, the base station, through RRC signaling or system information, may semi-statically configure a time unit appearing in Resource set 1, the x-th bit or bit group corresponding to Resource set 1 in the dynamic signaling indication, a time unit appearing in Resource set 2, the x-th bit or bit group corresponding to Resource set 2 in the dynamic signaling indication, and the y-th bit or bit group corresponding to Resource set 3 in the dynamic signaling indication.

As shown in FIG. 9, when the resource set is configured dynamically, the base station may configure an x-th bit or bit group in dynamic signaling indications corresponding to Resource 1 and Resource 2 and configure a y-th bit or bit group in a dynamic signaling indication corresponding to Resource set 3 through RRC signaling or system information, where x and y are positive integers not greater than a length of the dynamic signaling indication. In one slot, time-frequency resources corresponding to Resource set 1 and Resource set 2 may be the same or different, and may be semi-statically configured by the base station through RRC signaling or system information. At least one of the following parameters of Resource set 1 and Resource set 2 is different: a configuration period, a time domain offset and a monitor occasion, and these parameters may also be semi-statically configured by the base station through RRC signaling or system information. According to the configuration of the base station, when the terminal may determine that only Resource set 1 or Resource set 2 exists in a certain time unit scheduled by the PDSCH (which may be a sub-frame or a slot or a mini-slot or an OFDM symbol group), the resource set corresponding to the x-th bit or bit group may be Resource set 1 or Resource set 2, and the y-th bit or bit group in the dynamic signaling set always corresponds to Resource set 3.

Figure 10:
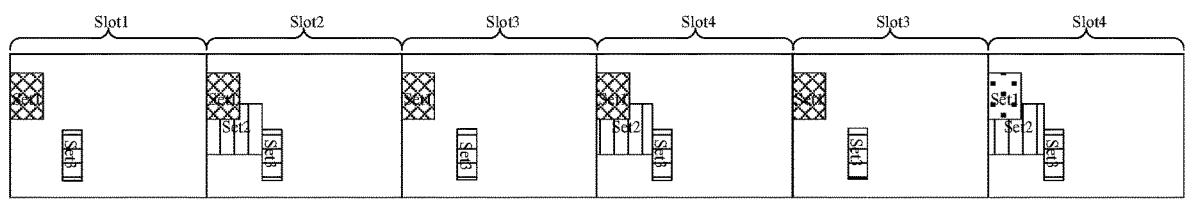
FIG. 10 is a schematic diagram 2 according to an Embodiment Fourteen.

Configurations of Resource set 1 and Resource set 2 may also be shown in FIG. 10. FIG. 10 is a schematic diagram 2 according to an embodiment fourteen. The x-th bit or bit group in the dynamic signaling indication corresponds to Resource set 1 in some time units (such as slots 1, 3 and 5) or corresponds to Resource set 1 and Resource set 2 in some time units (such as slots 2, 4 and 6), that is, a resource set index as well as the number of resource sets corresponding to the x-th bit or bit group may be different, and may also be semi-statically configured or determined by the terminal according to the configuration of the resource set.

Embodiment Fifteen

When the base station configures a length of dynamic signaling to be m bits and configures the number of candidate multiplexed resource sets that the dynamic signaling needs to indicate to be m+1, which resource set the m bits of the dynamic signaling correspond to depends on a resource set stored in a certain time unit and a resource set which overlaps resource allocation for the scheduled PDSCH transmission.

Using m=2 as an example, the length of the dynamic signaling is 2 bits, and the number of candidate multiplexed resource sets is 3, which are marked as Resource set 1, Resource set 2 and Resource set 3 respectively.

If these three resource sets exist in a certain time unit and all overlap resource allocation of the PDSCH transmission scheduled by the current time unit, one of the following manners or a combination thereof is adopted.

According to a sequence order or priority order of the resource sets, 2-bit dynamic signaling cannot indicate the multiplexing of the last resource set, that is, the terminal considers by default that the last resource set cannot be multiplexed by the PDSCH and the PDSCH needs to perform rate matching on the last resource set.

According to a sequence order or priority order of the resource sets, 1 bit in the dynamic signaling indication is used for jointly indicating the multiplexing of last two resource sets, that is, both the last two resource sets are multiplexed or the both are not multiplexed.

If in a certain time unit, the number of resource sets that overlap resource allocation of the PDSCH transmission scheduled by the current time unit is 2, 2 bits of the dynamic signaling indicate the two resource sets respectively.

If in a certain time unit, the number of resource sets that overlap resource allocation of the PDSCH transmission scheduled by the current time unit is less than 2, for example, 1, redundant bits exist in the dynamic indication signaling.

Embodiment Sixteen

When there is redundancy in the number of bits contained in dynamic indication signaling transmitted by a certain time unit compared to the number of resources sets that the current time unit needs to indicate, redundant bits may have one of functions or a combination thereof.

The redundant bits are used for indicating multiplexing or rate matching after at least one of a time domain, a frequency domain and a space domain of a resource set corresponding to an adjacent bit or bit group is split.

The redundant bits are used for indicating multiplexing or rate matching after at least one of a time domain, a frequency domain and a space domain of a specific resource set is split. The specific resource set may be a resource set that the terminal needs to monitor, or a resource set of a PDCCH receiving the scheduled PDSCH transmission, or a resource set sent by the dynamic signaling indication, or a specific resource set semi-statically configured by the base station.

The redundant bits are used for indicating multiplexing or rate matching after at least one of a time domain, a frequency domain and a space domain of every other resource set corresponding to all other adjacent bits or bit groups is split.

The redundant bits are used for indicating whether activation and deactivation or handover of a carrier or a BWP occur in a subsequent time unit. The split is that at least one of a time domain, a frequency domain and a space domain of a corresponding resource set is equally split and may be equally split into n part according to the number of redundant bits, where n is a positive integer, and after the equal split is performed, non-redundant bits and redundant bits jointly indicate which equally split parts of the corresponding resource set are capable of being multiplexed to the PDSCH transmission, or the PDSCH does not need to perform rate matching on which equally split parts.

The redundant bits are used for indicating whether a length of a dynamic signaling indication sent by a subsequent time unit changes. For example, a state '0' represents that the length does not change, and a state '1' represents that the length changes. For example, the length is recued or increased by z bits, where z may be equal to, but is not limited to, the number of redundant bits or 1.

Embodiment Seventeen

The base station configures one or more resource sets for the terminal, where some resource sets are configured to contain one or more complete or partial CORESETs while configurations of other resource sets are not related to the CORESET, or although specific time-frequency resources overlap the CORESET, the base station does not configure resource sets with specific CORESET sequences, but directly configures specific time-frequency resources contained in the resource sets in an explicit manner. During configuring, at least one of following resources may be configured: time domain resources contained in a time domain resource unit, frequency domain resources contained in a frequency domain resource unit, a period and offset of a time domain resource unit in a time domain, and a period and offset of a frequency domain resource unit in a frequency domain.

For example, the time domain resource unit may be a slot or a sub-frame, and the base station configures a certain resource set for occupying part of OFDM symbols of the slot or sub-frame in a time domain resource unit.

The frequency domain resource unit may be N PRBs, for example, 25 or 50 PRBs, and the base station configures a certain resource set for occupying part of PRBs of the N PRBs in a frequency domain resource unit.

The period of the time domain resource unit in the time domain may be one or more time domain resource units. For example, if the period is configured as 2 slots, it means that in every 2 slots, part of OFDM symbols of one slot is time domain resources of the resource set. The offset of the time domain resource unit in the time domain represents that time domain resources of the resource set exist in a time domain resource unit (which one time domain resource depends to a value of the offset) in a time domain period. If the offset is set to 1, it means that part of OFDM symbols of a first time domain resource unit in each time domain period is time domain resources of the resource set.

The period of the frequency domain resource unit in the frequency domain may be one or more frequency domain resource units, and may be limited to be one or more carried bandwidths or one or more BWPs of one carrier bandwidth. For example, if the period is set to 2 frequency domain resource units, it means that in every 2 frequency domain resource units, part of PRBs of one frequency domain resource unit is frequency domain resources of the resource set. The offset of the frequency domain resource unit in the frequency domain represents that frequency domain resources of the resource set exist in a frequency domain resource unit (which one frequency domain resource unit depends on a value of the offset) in one frequency domain period. If the offset is set to 1, it means that part of PRBs of a first frequency domain resource unit in each frequency domain period is frequency domain resources of the resource set.

Figure 11:
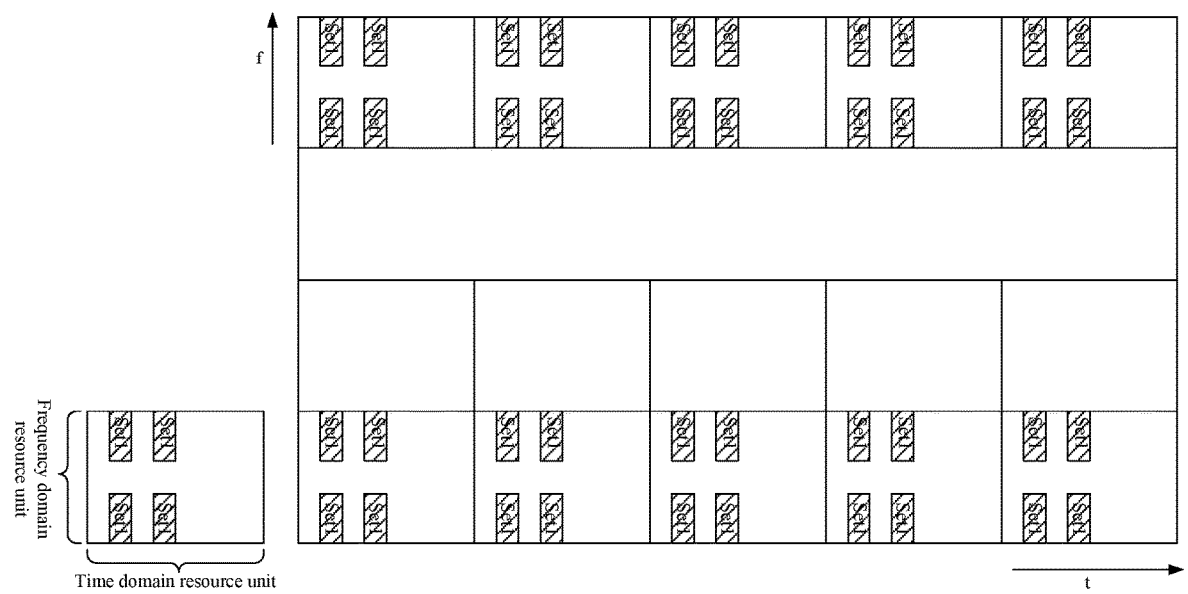
FIG. 11 is a flowchart of another method for configuring a first resource set according to an embodiment seventeen.

FIG. 11 is a flowchart of another method for configuring a first resource set according to an embodiment seventeen. As shown in FIG. 11, FIG. 11 shows a graphical representation of the above description.

From the above description of embodiments, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, or the like) to execute the methods according to each embodiment of the present disclosure.

Embodiment Eighteen

This embodiment further provides a device for determining time-frequency resources for implementing the above-mentioned embodiments and preferred embodiments. What has been described will not be repeated. As used below, the term "module" may be software, hardware or a combination thereof capable of implementing predetermined functions. The apparatus described in the following embodiment is preferably implemented by software, but implementation by hardware or a combination of software and hardware is also possible and conceived.

According to another embodiment of the present disclosure, a device for determining time-frequency resources is further provided. The device is applied to a first communication node and includes a first determination module and a transmission module.

The first determination module is configured to determine at least one piece of the following information about a first resource set for a second communication node: time-frequency resources of a second resource set contained in the first resource set, configuration information of the second resource set contained in the first resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to perform rate matching.

The transmission module is configured to transmit the information to the second communication node, where the PDSCH transmission includes a process in which data is transmitted to the second communication node through a PDSCH, and the PUSCH transmission includes a process in which the second communication node transmits data to the first communication node through a PUSCH.

It is to be added that the method executed by the first determination module in the above Embodiment one may be executed by the above device applied to the first determination module.

Optionally, the first resource set is one of the following information: one or more complete or partial resource sets; one or more complete or partial CORESETs; and one or more specific signal resources or specific channel resources, where the specific signal resource or the specific channel resource includes one or more of the following: a reference signal time domain resource, a reference signal frequency domain resource, a synchronizing signal time domain resource, a synchronizing signal frequency domain resource, a broadcast channel time domain resource, and a broadcast channel frequency domain resource.

Optionally, the second resource set includes one of the following information: one or more complete or partial CORESETs, and one or more specific signal resources or specific channel resources, where the specific signal resource or the specific channel resource includes one or more of the following: a reference signal time domain resource, a reference signal frequency domain resource, a synchronizing signal time domain resource, a synchronizing signal frequency domain resource, a broadcast channel time domain resource, and a broadcast channel frequency domain resource.

Optionally, the first determination module configures one or more first resource sets for a second communication node, and time-frequency resources of multiple configured first resource sets are forbidden to partially overlap or forbidden to completely overlap.

Optionally, when the first determination module configures multiple first resource sets for the second communication node, the first determination module configures priorities for part or all of the multiple first resource sets.

Optionally, when time-frequency resources of the multiple first resource sets overlap, whether the overlapped time-frequency resources are allowed to be multiplexed to the PDSCH transmission or whether the PDSCH transmission needs to perform rate matching around the overlapped time-frequency resources is determined through following manner: the determination is made according to a dynamic signaling indication of a first resource set having a higher priority.

Optionally, the first resource set for the second communication node includes one of the following: part of time domain resources in a time domain resource unit are configured as the first resource set; and part of frequency domain resources in a frequency domain resource unit are configured as the first resource set.

Optionally, the first resource set for the second communication node includes at least one of the following: in a time domain, part of time domain resources of a periodically configured time domain resource unit are configured as the first resource set; the time domain resource unit is shifted; in a frequency domain, part of frequency domain resources in a frequency domain resource unit within a designated subcarrier range are configured as the first resource set; and in the frequency domain, part of frequency domain resources in a frequency domain resource unit within a designated bandwidth range are configured as the first resource set.

Optionally, when an overlap occurs in time-frequency resources of multiple first resource sets, whether the overlapped time-frequency resources are allowed to be multiplexed to the PDSCH transmission or whether the PDSCH transmission needs to perform rate matching around the overlapped time-frequency resources is determined through following manner: an AND operation or an OR operation is performed on dynamic signaling indications of all multiple overlapping first resource sets; and the determination is made according results of the AND operation or the OR operation.

Optionally, the following information is agreed: the dynamic signaling indication being set to 1 is agreed to indicate that all or part of the corresponding first resource set is allowed to be multiplexed to the PDSCH transmission, or that the PDSCH transmission does not need to perform rate matching around all or part of resources in the corresponding first resource set; and the dynamic signaling indication being set to 0 is agreed to indicate that all or part of the corresponding first resource set is forbidden to be multiplexed to the PDSCH transmission, or that the PDSCH transmission needs to perform rate matching around all or part of resources in the corresponding first resource set; and the step that the AND operation or the OR operation is performed on dynamic signaling indications of all multiple overlapping first resource sets, and the determination is made according results of the AND operation or the OR operation includes: performing the OR operation on dynamic signaling indications of the multiple first resource sets in which the overlap occurs in the time-frequency resources; and determining whether the overlapped time-frequency resources are allowed to be multiplexed to the PDSCH transmission or whether the PDSCH transmission needs to perform rate matching around the overlapped time-frequency resources according to results of the OR operation.

Optionally, in condition that the dynamic signaling indication being set to 1 is agreed to indicate that all or part of the corresponding first resource set is forbidden to be multiplexed to the PDSCH transmission or that the PDSCH transmission needs to perform rate matching around all or part of time-frequency resources in the corresponding first resource set, and the dynamic signaling indication being set to 0 is agreed to indicate that all or part of the corresponding first resource set is allowed to be multiplexed to the PDSCH transmission or that the PDSCH transmission does not need to perform rate matching around all or part of time-frequency resources in the corresponding first resource set, the method further includes: performing the AND operation on dynamic signaling indications of the multiple overlapping first resource sets; and determining whether the overlapped time-frequency resources are allowed to be multiplexed to the PDSCH transmission or whether the PDSCH transmission needs to perform rate matching around the overlapped time-frequency resources according to results of the AND operation.

Optionally, when an overlap occurs in time-frequency resources of multiple first resource sets, the following information is determined through different manner for different types of the first resource sets: information about whether the overlapped time-frequency resources are allowed to be multiplexed to the PDSCH transmission or whether the PDSCH transmission needs to perform rate matching around the overlapped time-frequency resources; where the different types of the first resource sets include one of the following: time-frequency resource configuration manners being different, time-frequency resource configuration ranges being different, time-frequency resource configuration granularities being different, and time-frequency resource configuration priorities being different.

Optionally, when the first resource set contains multiple second resource sets or is equivalent to multiple second resource sets, multiple second resource sets contained in the same first resource set needs to meet at least one of the following characteristics: blind detection moment configurations or blind detection period configurations of the second communication node in the multiple second resource sets are the same; levels of blind detection moment configurations or blind detection period configurations of the multiple second resource sets are the same and are a slot level, where levels of blind detection moment configurations or blind detection period configurations of the multiple second resource sets being the slot level is configured to indicate one of the following: each of the blind detection moment configurations or each of the period configurations is a slot, and each of the blind detection moment configurations or each of the period configurations is at intervals of multiple slots; levels of blind detection moment configurations or blind detection period configurations of the multiple second resource sets are the same and are a mini-slot level, where levels of blind detection moment configurations or blind detection period configurations of the multiple second resource sets being the mini-slot level is configured to indicate one of the following: each of the blind detection moment configurations or each of the period configurations is a mini-slot, and each of the blind detection moment configurations or each of the period configurations is at intervals of multiple mini-slots; levels of blind detection moment configurations or blind detection period configurations of the multiple second resource sets are the same and are an OFDM symbol level, where levels of blind detection moment configurations or blind detection period configurations of the multiple second resource sets being the OFDM symbol level is configured to indicate one of the following: each of the blind detection moment configurations or each of the period configurations is an OFDM symbol, and each of the blind detection moment configurations or each of the period configurations is at intervals of multiple OFDM symbols; blind detection moment configurations or blind detection period configurations of the multiple second resource sets need meet an inclusion relationship, where the inclusion relationship is that: for a second resource set having a sparse number of times of blind detections or a sparse period configuration and a second resource set having an intensive number of times of blind detections or an intensive period configuration, a blind detection moment or period configuration of the former is a subset of a blind detection moment or period configuration of the latter; and the number of times of occurrence of blind detection moment configurations or blind detection period configurations of the multiple second resource sets in a fixed time unit is the same, where the fixed time unit includes one of the following: a radio frame, a sub-frame, a slot, a PDCCH domain or an uplink control channel range of a slot, and a fixed number of several OFDM symbols at fixed locations of a slot.

Optionally, the dynamic signaling indication is a multiplexing or rate matching dynamic signaling indication for the first resource set, where a valid time domain range of the multiplexing or rate matching dynamic signaling indication for the first resource set is determined to be one of the following: time-frequency resources corresponding to a first blind detection moment or a first period configuration moment where the first resource set overlaps resources used by the PDSCH transmission; time-frequency resources corresponding to all blind detection moments or all period configuration moments where the first resource set overlaps resources used by the PDSCH transmission; time-frequency resources corresponding to all blind detection moments or all period configuration moments where the first resource set overlaps resources used by the PDSCH transmission in a PDCCH domain; a valid time domain range determined according to results of a blind detection performed by the second communication node on time-frequency resources where the first resource set overlaps resources used by the PDSCH transmission; a first sub-frame or a first slot where the first resource set overlaps resources used by the PDSCH transmission; and all sub-frames or all slots where the first resource set overlaps resources used by the PDSCH transmission.

Optionally, the PDCCH domain is allowed to be one of the following levels: a sub-frame level, a slot level, a mini-slot level, and an OFDM symbol level; where in response to determining that the PDCCH domain is the sub-frame level, the PDCCH domain is first several OFDM symbols of a sub-frame; in response to determining that the PDCCH domain is the slot level, the PDCCH domain is first several OFDM symbols of a slot; in response to determining that the PDCCH domain is the mini-slot level, the PDCCH domain is first several OFDM symbols of a mini-slot or several OFDM symbols at fixed locations of a slot; and in response to determining that the PDCCH domain is the OFDM symbol level, the PDCCH domain is OFDM symbols at preset fixed locations.

Optionally, when results of the blind detection of the second communication node are that a PDCCH sent to the second communication node is detected, the method further includes: performing, by the second communication node, rate matching around time-frequency resources occupied by the detected PDCCH sent to the second communication node, and for remaining resources other than the time-frequency resources occupied by the PDCCH sent to the second communication node, the multiplexing or rate matching dynamic signaling indication being valid for the following moments: the blind detection moment, and resources where the first resource set overlaps resources used by the PDSCH transmission; or the multiplexing or rate matching dynamic signaling indication being invalid for the first resource set at the blind detection moment; where at the blind detection moment, all or part of time-frequency resources where the first resource set overlaps resources used by the PDSCH transmission are forbidden to be multiplexed to the PDSCH transmission, or at the blind detection moment, the PDSCH transmission needs to perform rate matching around all or part of time-frequency resources where the first resource set overlaps resources used by the PDSCH transmission.

Optionally, when results of the blind detection of the second communication node are that a PDCCH sent to the second communication node is not detected, the method further includes: the multiplexing or rate matching dynamic signaling indication being valid for the first resource set at the blind detection moment; or the multiplexing or rate matching dynamic signaling indication being invalid for the first resource set at the blind detection moment; where at the blind detection moment, all or part of time-frequency resources where the first resource set overlaps resources used by the PDSCH transmission are allowed to be multiplexed to the PDSCH transmission, or the PDSCH transmission does not need to perform rate matching around all or part of time-frequency resources where the first resource set overlaps resources used by the PDSCH transmission at the blind detection moment.

Optionally, the transmission module sends a dynamic indication for activating or inactivating the dynamic signaling indication to the second communication node.

Optionally, the first determination module determines the following information about the first resource set for the second communication node: dynamic signaling indication for indicating whether the first resource set is multiplexed to a PDSCH transmission or whether the PDSCH transmission needs to perform rate matching; and after the above step is executed, the transmission module sends one or more dynamic signaling indications to the second communication node for a first resource set or a group of first resource sets.

Optionally, a first resource set corresponding to the dynamic signaling indication is determined in one of the following manners: a semi-static configuration manner and a dynamic determination manner. Where the dynamic signaling indication is allowed to correspond to different first resource sets in different time units, or is allowed to correspond to different numbers of first resource sets in different time units. Where the time unit includes one: a slot, a mini-slot, an OFDM symbol, and a sub-frame.

Optionally, part or all of bits of the dynamic signaling indication are allowed to indicate at least one of the following meanings: the part or all of bits are used for indicating at least one piece of the following information of a first resource set corresponding to an adjacent bit or an adjacent bit group: a situation of multiplexing or rate matching after a time domain split is performed, a situation of multiplexing or rate matching after a frequency domain split is performed, and a situation of multiplexing or rate matching after a space domain split is performed; the part or all of bits are used for indicating at least one piece of the following information of a specific first resource set: a situation of multiplexing or rate matching after a time domain split is performed, a situation of multiplexing or rate matching after a frequency domain split is performed, and a situation of multiplexing or rate matching after a space domain split is performed, where the specific first resource set is allowed to be one of the following: a first resource set on which the second communication node needs to perform a blind detection, a first resource set where a PDCCH for scheduling the PDSCH transmission is located, a first resource set sent by the dynamic signaling indication, and a specific first resource set semi-statically configured by the first determination module; the part or all of bits are used for indicating one of the following information of all first resource sets corresponding to other bits or bit groups: a situation of multiplexing or rate matching after a time domain split is performed, a situation of multiplexing or rate matching after a frequency domain split is performed, and a situation of multiplexing or rate matching after a space domain split is performed; the part or all of bits are used for indicating whether at least one of following conditions occur in a subsequent time unit: activation of a carrier or a bandwidth part, deactivation of a carrier or a bandwidth part, and handover of a carrier or a bandwidth part; and the part or all of bits are used for indicating whether a length of a dynamic signaling indication sent by a subsequent time unit changes.

Optionally, the split includes: at least one of the following of the first resource set is split equally: a time domain, a frequency domain and a space domain; where n equal split is determined to be performed according to the number of redundant bits, and n is a positive integer; and after the equal split is performed, non-redundant bits and redundant bits jointly indicate which equally split parts of the first resource set are capable of being multiplexed to the PDSCH transmission, or on which equally split parts the PDSCH does not need to perform rate matching; where the redundant bit is part or all of the bits.

According to another embodiment of the present disclosure, a device for determining time-frequency resources is further provided. The device is applied to a second communication node and includes a reception module and a second determination module.

The reception module is configured to receive information about a first resource set transmitted by a first communication node, where the information includes at least one of the following: time-frequency resources of a second resource set contained in the first resource set, configuration information of the second resource set contained in the first resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to perform rate matching.

The second determination module is configured to determine one of the following configuration information according to the information: time-frequency resources allowed to be multiplexed to the PDSCH transmission and time-frequency resources on which the PDSCH transmission does not need to perform rate matching, where the PDSCH transmission includes a process in which data is transmitted through a PDSCH, and the PUSCH transmission includes a process in which data is transmitted to the first communication node through a PUSCH.

It is to be added that the method executed by the second communication node in the above Embodiment one may be executed by the above device applied to the second communication node.

Optionally, the first resource set is one of the following information: one or more complete or partial resource sets, one or more complete or partial CORESETs, and one or more specific signal resources or specific channel resources, where the specific signal resource or the specific channel resource includes one or more of the following: a reference signal resource, a synchronizing signal resource, and a broadcast channel resource.

Optionally, the second resource set includes one of the following information: one or more complete or partial CORESETs, and one or more specific signal resources or specific channel resources, where the specific signal resource or the specific channel resource includes one of the following: a reference signal resource, a synchronizing signal resource, and a broadcast channel resource.

Optionally, the dynamic signaling indication is a multiplexing or rate matching dynamic signaling indication for the first resource set, where a valid time domain range of the multiplexing or rate matching dynamic signaling indication for the first resource set is determined to be one of the following: time-frequency resources corresponding to a first blind detection moment or a first period configuration moment where the first resource set overlaps resources used by the PDSCH transmission; time-frequency resources corresponding to all blind detection moments or all period configuration moments where the first resource set overlaps resources used by the PDSCH transmission; time-frequency resources corresponding to all blind detection moments or all period configuration moments where the first resource set overlaps resources used by the PDSCH transmission in a PDCCH domain;

a valid time domain range determined according to results of a blind detection performed by the second determination module on time-frequency resources where the first resource set overlaps resources used by the PDSCH transmission; a first sub-frame or a first slot where the first resource set overlaps resources used by the PDSCH transmission; and all sub-frames or all slots where the first resource set overlaps resources used by the PDSCH transmission.

Optionally, the second determination module performs the blind detection, where when results of the blind detection of the second determination module are that a PDCCH sent to the second determination module is detected, the method further includes: performing, by the second determination module, rate matching around time-frequency resources occupied by the detected PDCCH sent to the second determination module, and for remaining resources other than the time-frequency resources occupied by the PDCCH sent to the second determination module, determining, by the second determination module, that the multiplexing or rate matching dynamic signaling indication is valid for the following moments: the blind detection moment, and resources where the first resource set overlaps resources used by the PDSCH transmission; or determining, by the second determination module, that the multiplexing or rate matching dynamic signaling indication is invalid for the first resource set at the blind detection moment; where at the blind detection moment, all or part of time-frequency resources where the first resource set overlaps resources used by the PDSCH transmission are forbidden to be multiplexed to the PDSCH transmission, or the PDSCH transmission needs to perform rate matching around all or part of time-frequency resources where the first resource set overlaps resources used by the PDSCH transmission at the blind detection moment.

Optionally, the second determination module performs the blind detection, where when results of the blind detection of the second determination module are that a PDCCH sent to the second determination module is not detected, the method further includes: the multiplexing or rate matching dynamic signaling indication being valid for the first resource set at the blind detection moment; or the multiplexing or rate matching dynamic signaling indication being invalid for the first resource set at the blind detection moment; where at the blind detection moment, all or part of time-frequency resources where the first resource set overlaps resources used by the PDSCH transmission are allowed to be multiplexed to the PDSCH transmission, or the PDSCH transmission does not need to perform rate matching around all or part of time-frequency resources where the first resource set overlaps resources used by the PDSCH transmission at the blind detection moment.

It is to be noted that the various modules described above may be implemented by software or hardware. Implementation by hardware may, but may not necessarily, be performed in the following manners: the various modules described above are located in the same processor, or the various modules described above are located in different processors in any combination form.

Embodiment Nineteen

According to another embodiment of the present disclosure, a base station is further provided. The base station includes a first processor and a first communication device.

The first processor is configured to determine at least one piece of the following information about a first resource set for a second communication node: time-frequency resources of a second resource set contained in the first resource set, configuration information of the second resource set contained in the first resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to perform rate matching.

The first communication device is configured to transmit the information to the second communication node, where the PDSCH transmission includes a process in which data is transmitted to the second communication node through a PDSCH, and the PUSCH transmission includes a process in which the second communication node transmits data to a first communication node through a PUSCH.

It is to be added that embodiments executed by the first communication node in the above Embodiments one and two may be executed by the above base station.

According to another embodiment of the present disclosure, a terminal is further provided. The terminal includes a second communication device and a second processor.

The second communication device is configured to receive information about a first resource set transmitted by a first communication node, where the information includes at least one of the following: time-frequency resources of a second resource set contained in the first resource set, configuration information of the second resource set contained in the first resource set, time-frequency resource configuration information of the first resource set, and a dynamic signaling indication used for indicating whether the first resource set is multiplexed to a PDSCH transmission or a PUSCH transmission or whether the PDSCH transmission or the PUSCH transmission needs to perform rate matching.

The second processor is configured to determine one of the following configuration information according to the information: time-frequency resources allowed to be multiplexed to the PDSCH transmission and time-frequency resources on which the PDSCH transmission does not need to perform rate matching. Where the PDSCH transmission includes a process of data transmission through a PDSCH, and the PUSCH transmission includes a process of data transmission through a PUSCH.

It is to be added that embodiments executed by the second communication node in the above Embodiment one and 2 may be executed by the above terminal.

Embodiment Twenty

According to another embodiment of the present disclosure, a processor is further provided. The processor is configured to execute programs which, when executed, perform the method of any one of the embodiments described above.

Embodiment Twenty-One

According to another embodiment of the present disclosure, a storage medium is further provided. The storage medium includes stored programs which, when executed, perform the method of any one of the embodiments described above.

Apparently, it should be understood by those skilled in the art that each of the modules or steps of the present disclosure described above may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only exemplary embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

The invention claimed is:

1. A method for determining time-frequency resources, comprising:
   receiving, by a second communication node, information about a first resource set transmitted by a first communication node, wherein the information about the first resource set comprises:
   time-frequency resources of a second resource set comprised in the first resource set,
   configuration information of the second resource set comprised in the first resource set,
   time-frequency resource configuration information of the first resource set, and
   a dynamic signaling indication to indicate whether a physical downlink shared channel, PDSCH, transmission is to perform rate matching; and
   determining, according to the information about the first resource set, time-frequency resources on which the PDSCH transmission is to perform rate matching,
   wherein the first resource set comprises one or more resource sets or one or more control resource sets, CORESETs,
   wherein the dynamic signaling indication comprises a rate matching dynamic signaling indication for the first resource set, and a valid time domain range of the rate matching dynamic signaling indication for the first resource set includes all slots where the first resource set is overlapped with resources used by the PDSCH transmission,
   wherein the first resource set comprises resources configured periodically from at least part of time domain resources in a time domain resource unit, and
   wherein the valid time domain range of the rate matching dynamic signaling indication for the first resource set is related to time-frequency resources corresponding to all blind detection moments.

2. The method of claim 1, wherein when an overlap occurs in time-frequency resources of a plurality of first resource sets, whether the PDSCH transmission is to perform rate matching around the overlapped resources is determined by:
  performing an AND operation or an OR operation on dynamic signaling indications of all of a plurality of first resource sets in which the overlap occurs in the time-frequency resources; and
  determining, according to a result of the AND operation or the OR operation, whether the PDSCH transmission is to perform rate matching around the overlapped time-frequency resources.

3. The method of claim 1, wherein at least some bits of the dynamic signaling indicate at least one of:
  information of the first resource set corresponding to an adjacent bit or an adjacent bit group, comprising at least one of: a situation of rate matching after a time domain split is performed, a situation of rate matching after a frequency domain split is performed, or a situation of rate matching after a space domain split is performed;
  information of the first resource set on which the second communication node is to perform a blind detection, of the first resource set where a physical downlink control channel, PDCCH, for scheduling the PDSCH transmission is located, of the first resource set sent by the dynamic signaling indication, or of the first resource set that is semi-statically configured by the first communication node, comprising at least one of: a situation of rate matching after a time domain split is performed, a situation of rate matching after a frequency domain split is performed, or a situation of rate matching after a space domain split is performed;
  information of all first resource sets corresponding to other bits or bit groups, comprising at least one of: a situation of rate matching after a time domain split is performed, a situation of rate matching after a frequency domain split is performed, or a situation of rate matching after a space domain split is performed;
  whether at least one of following occurs in a subsequent time unit: activation of a carrier or a bandwidth part, deactivation of a carrier or a bandwidth part, or handover of a carrier or a bandwidth part; or
  whether a length of a dynamic signaling indication sent by a subsequent time unit changes.

4. A method for determining time-frequency resources, comprising:
  determining, by a first communication node, information about a first resource set, the information about the first resource set comprising:
  time-frequency resources of a second resource set comprised in the first resource set,
  configuration information of the second resource set comprised in the first resource set,
  time-frequency resource configuration information of the first resource set, and
  a dynamic signaling indication to indicate whether a physical downlink shared channel, PDSCH, transmission is to perform rate matching; and
  transmitting, by the first communication node, the information about the first resource set to a second communication node to cause the second communication node to determine time-frequency resources on which the PDSCH transmission is to perform rate matching,
  wherein the first resource set comprises one or more resource sets or one or more control resource sets, CORESETs,
  wherein the dynamic signaling indication comprises a rate matching dynamic signaling indication for the first resource set, and a valid time domain range of the rate matching dynamic signaling indication for the first resource set includes all slots where the first resource set is overlapped with resources used by the PDSCH transmission,
  wherein the first resource set comprises resources configured periodically from at least part of time domain resources in a time domain resource unit, and
  wherein the valid time domain range of the rate matching dynamic signaling indication for the first resource set is related to time-frequency resources corresponding to all blind detection moments.

5. The method of claim 4, wherein:
  when an overlap occurs in time-frequency resources of a plurality of first resource sets, whether the PDSCH transmission is to perform rate matching around the overlapped resources is determined by:
  performing an AND operation or an OR operation on dynamic signaling indications of all of a plurality of first resource sets in which the overlap occurs in the time-frequency resources; and
  determining, according to a result of the AND operation or the OR operation, whether the PDSCH transmission is to perform rate matching around the overlapped time-frequency resources.

6. The method of claim 4, wherein at least some bits of the dynamic signaling indicate at least one of:
  information of the first resource set corresponding to an adjacent bit or an adjacent bit group, comprising at least one of: a situation of rate matching after a time domain split is performed, a situation of rate matching after a frequency domain split is performed, or a situation of rate matching after a space domain split is performed;
  information of the first resource set on which the second communication node is to perform a blind detection, of the first resource set where a physical downlink control channel, PDCCH, for scheduling the PDSCH transmission is located, of the first resource set sent by the dynamic signaling indication, or of the first resource set that is semi-statically configured by the first communication node, comprising at least one of: a situation of rate matching after a time domain split is performed, a situation of rate matching after a frequency domain split is performed, or a situation of rate matching after a space domain split is performed;
  information of all first resource sets corresponding to other bits or bit groups, comprising at least one of: a situation of rate matching after a time domain split is performed, a situation of rate matching after a frequency domain split is performed, or a situation of rate matching after a space domain split is performed;
  whether at least one of following occurs in a subsequent time unit: activation of a carrier or a bandwidth part, deactivation of a carrier or a bandwidth part, or handover of a carrier or a bandwidth part; and
  whether a length of a dynamic signaling indication sent by a subsequent time unit changes.

7. A device, comprising:
  at least one processor configured to:
  receive information about a first resource set transmitted by a communication node,
  wherein the information about the first resource set comprises:
  time-frequency resources of a second resource set comprised in the first resource set,
  configuration information of the second resource set comprised in the first resource set, time-frequency resource configuration information of the first resource set, and a dynamic signaling indication to indicate whether a physical downlink shared channel, PDSCH, transmission is to perform rate matching; and determining, according to the information about the first resource set, time-frequency resources on which the PDSCH transmission is to perform rate matching, wherein the first resource set comprises one or more resource sets or one or more control resource sets, CORESETs, wherein the dynamic signaling indication comprises a rate matching dynamic signaling indication for the first resource set, and a valid time domain range of the rate matching dynamic signaling indication for the first resource set includes all slots where the first resource set is overlapped with resources used by the PDSCH transmission, wherein the first resource set comprises resources configured periodically from at least part of time domain resources in a time domain resource unit, and wherein the valid time domain range of the rate matching dynamic signaling indication for the first resource set is related to time-frequency resources corresponding to all blind detection moments.

8. The device of claim 7, wherein when an overlap occurs in time-frequency resources of a plurality of first resource sets, whether the PDSCH transmission is to perform rate matching around the overlapped resources is determined by:

performing an AND operation or an OR operation on dynamic signaling indications of all of a plurality of first resource sets in which the overlap occurs in the time-frequency resources; and determining, according to a result of the AND operation or the OR operation, whether the PDSCH transmission is to perform rate matching around the overlapped time-frequency resources.

9. The device of claim 7, wherein at least some bits of the dynamic signaling indicate at least one of:

information of the first resource set corresponding to an adjacent bit or an adjacent bit group, comprising at least one of: a situation of rate matching after a time domain split is performed, a situation of rate matching after a frequency domain split is performed, or a situation of rate matching after a space domain split is performed;

information of the first resource set on which the second communication node is to perform a blind detection, of the first resource set where a physical downlink control channel, PDCCH, for scheduling the PDSCH transmission is located, of the first resource set sent by the dynamic signaling indication, or of the first resource set that is semi-statically configured by the first communication node, comprising at least one of: a situation of rate matching after a time domain split is performed, a situation of rate matching after a frequency domain split is performed, or a situation of rate matching after a space domain split is performed;

information of all first resource sets corresponding to other bits or bit groups, comprising at least one of: a situation of rate matching after a time domain split is performed, a situation of rate matching after a frequency domain split is performed, or a situation of rate matching after a space domain split is performed;

whether at least one of following occurs in a subsequent time unit: activation of a carrier or a bandwidth part, deactivation of a carrier or a bandwidth part, or handover of a carrier or a bandwidth part; and whether a length of a dynamic signaling indication sent by a subsequent time unit changes.

10. A device, comprising:
at least one processor configured to:
determine information about a first resource set, the information about the first resource set comprising:
time-frequency resources of a second resource set comprised in the first resource set,
configuration information of the second resource set comprised in the first resource set,
time-frequency resource configuration information of the first resource set, and
a dynamic signaling indication to indicate whether a physical downlink shared channel, PDSCH, transmission is to perform rate matching; and
transmit the information about the first resource set to a communication node to cause the communication node to determine time-frequency resources on which the PDSCH transmission is to perform rate matching,
wherein the first resource set comprises one or more resource sets or one or more control resource sets, CORESETs,
wherein the dynamic signaling indication comprises a rate matching dynamic signaling indication for the first resource set, and a valid time domain range of the rate matching dynamic signaling indication for the first resource set includes all slots where the first resource set is overlapped with resources used by the PDSCH transmission,
wherein the first resource set comprises resources configured periodically from at least part of time domain resources in a time domain resource unit, and
wherein the valid time domain range of the rate matching dynamic signaling indication for the first resource set is related to time-frequency resources corresponding to all blind detection moments.

11. The device of claim 10, wherein when an overlap occurs in time-frequency resources of a plurality of first resource sets, whether the PDSCH transmission is to perform rate matching around the overlapped resources is determined by:

performing an AND operation or an OR operation on dynamic signaling indications of all of a plurality of first resource sets in which the overlap occurs in the time-frequency resources; and determining, according to a result of the AND operation or the OR operation, whether the PDSCH transmission is to perform rate matching around the overlapped time-frequency resources.

12. The device of claim 10, wherein at least some bits of the dynamic signaling indicate at least one of:

information of the first resource set corresponding to an adjacent bit or an adjacent bit group, comprising at least one of: a situation of rate matching after a time domain split is performed, a situation of rate matching after a frequency domain split is performed, or a situation of rate matching after a space domain split is performed;

information of the first resource set on which the second communication node is to perform a blind detection, of the first resource set where a physical downlink control channel, PDCCH, for scheduling the PDSCH transmission is located, of the first resource set sent by the dynamic signaling indication, or of the first resource set that is semi-statically configured by the first communication node, comprising at least one of: a situation of rate matching after a time domain split is performed, a situation of rate matching after a frequency domain split is performed, and a situation of rate matching after a space domain split is performed;

information of all first resource sets corresponding to other bits or bit groups, comprising at least one of: a situation of rate matching after a time domain split is performed, a situation of rate matching after a frequency domain split is performed, or a situation of rate matching after a space domain split is performed;

whether at least one of following occurs in a subsequent time unit: activation of a carrier or a bandwidth part, deactivation of a carrier or a bandwidth part, or handover of a carrier or a bandwidth part; and whether a length of a dynamic signaling indication sent by a subsequent time unit changes.

* * * * *